United States Patent
Kurokawa

(10) Patent No.: US 8,587,479 B2
(45) Date of Patent: Nov. 19, 2013

(54) POSITION INFORMATION DETECTION SYSTEM AND POSITION INFORMATION DETECTION METHOD

(75) Inventor: Yoshiyuki Kurokawa, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 669 days.

(21) Appl. No.: 12/842,581

(22) Filed: Jul. 23, 2010

(65) Prior Publication Data

US 2010/0283683 A1 Nov. 11, 2010

Related U.S. Application Data

(63) Continuation of application No. 11/819,578, filed on Jun. 28, 2007, now Pat. No. 7,786,936.

(30) Foreign Application Priority Data

Jul. 20, 2006 (JP) .................................. 2006-198261

(51) Int. Cl.
*G01S 3/02* (2006.01)

(52) U.S. Cl.
USPC .......................................... 342/458; 342/451

(58) Field of Classification Search
USPC ........ 342/451, 458, 463–465; 455/456.1, 457
See application file for complete search history.

(56) References Cited

U.S. PATENT DOCUMENTS

| | | |
|---|---|---|
| 4,383,150 A | 5/1983 | Cromer et al. |
| 4,903,162 A | 2/1990 | Kopelman |
| 5,578,933 A | 11/1996 | Nonaka |
| 5,873,041 A | 2/1999 | Ishii |
| 5,874,785 A | 2/1999 | Liu |
| 6,784,842 B2 | 8/2004 | Vesuna |
| 6,957,072 B2 | 10/2005 | Kangras et al. |
| 7,026,924 B2 | 4/2006 | Degrauwe et al. |
| 7,026,935 B2 | 4/2006 | Diorio et al. |

(Continued)

FOREIGN PATENT DOCUMENTS

| | | |
|---|---|---|
| DE | 101 42 951 | 4/2003 |
| EP | 0 713 344 | 5/1996 |

(Continued)

OTHER PUBLICATIONS

Search Report (Application No. 07012617.2) dated Oct. 26, 2007.

(Continued)

*Primary Examiner* — Dao Phan

(74) *Attorney, Agent, or Firm* — Eric J. Robinson; Robinson Intellectual Property Law Office, P.C.

(57) ABSTRACT

An object of the present invention is to achieve a position information detection system with high precision when an obstruction and a reflective object exist. A position information detection system includes a reader/writer whose position is known, a first RF chip whose position is known, and a second RF chip attached to an object to be detected; and calculates a distance between the reader/writer and the second RF chip from a first calculated distance between the reader/writer and the first RF chip, which is calculated from a signal intensity of a communication signal transmitted from the reader/writer, detected by the first RF chip, a second calculated distance between the second RF chip and the reader/writer, which is calculated from a signal intensity of a communication signal transmitted from the reader/writer, detected by the second RF chip, and a distance between the reader/writer and the first RF chip.

15 Claims, 22 Drawing Sheets

(56) References Cited

U.S. PATENT DOCUMENTS

| | | |
|---|---|---|
| 7,119,738 B2 | 10/2006 | Bridgelall et al. |
| 7,170,412 B2 | 1/2007 | Knox et al. |
| 7,221,278 B2 | 5/2007 | Chiu et al. |
| 7,253,717 B2 | 8/2007 | Armstrong et al. |
| 7,283,037 B2 | 10/2007 | Diorio et al. |
| 7,284,703 B2 | 10/2007 | Powell et al. |
| 7,304,579 B2 | 12/2007 | Diorio et al. |
| 7,391,329 B2 | 6/2008 | Humes et al. |
| 7,405,660 B2 | 7/2008 | Diorio et al. |
| 7,408,466 B2 | 8/2008 | Diorio et al. |
| 7,417,548 B2 | 8/2008 | Kavounas et al. |
| 7,432,814 B2 | 10/2008 | Dietrich et al. |
| 7,436,308 B2 | 10/2008 | Sundstrom et al. |
| 7,474,214 B2 | 1/2009 | Bauchot et al. |
| 7,479,883 B2 | 1/2009 | Chiu |
| 7,508,305 B2 | 3/2009 | Yamazaki et al. |
| 7,541,843 B1 | 6/2009 | Hyde et al. |
| 7,576,657 B2 | 8/2009 | Duron et al. |
| 7,589,618 B2 | 9/2009 | Diorio et al. |
| 7,592,897 B2 | 9/2009 | Diorio et al. |
| 7,626,488 B2 | 12/2009 | Armstrong et al. |
| 7,795,617 B2 | 9/2010 | Koyama et al. |
| 7,893,837 B2 | 2/2011 | Yamazaki et al. |
| 2004/0140931 A1 | 7/2004 | Vesuna |
| 2007/0018792 A1 | 1/2007 | Taki et al. |
| 2007/0073513 A1 | 3/2007 | Posamentier |
| 2007/0075873 A1 | 4/2007 | Yang et al. |
| 2007/0252208 A1 | 11/2007 | Koyama et al. |
| 2010/0001842 A1 | 1/2010 | Duron et al. |

FOREIGN PATENT DOCUMENTS

| | | |
|---|---|---|
| EP | 1316812 | 6/2003 |
| EP | 1 437 603 | 7/2004 |
| EP | 1 638 035 | 3/2006 |
| JP | 2000-046939 A | 2/2000 |
| JP | 2000-149194 | 5/2000 |
| JP | 2001-356160 A | 12/2001 |
| JP | 2002-098749 | 4/2002 |
| JP | 2005-164248 A | 6/2005 |
| JP | 2005-209162 A | 8/2005 |
| JP | 2005-274363 A | 10/2005 |
| JP | 2005-316724 | 11/2005 |
| JP | 2005-321231 A | 11/2005 |
| JP | 2006-503376 | 1/2006 |
| JP | 2006-156969 A | 6/2006 |
| JP | 2006-516853 | 7/2006 |
| WO | WO 00/67208 | 11/2000 |
| WO | WO 2004/036482 | 4/2004 |
| WO | WO-2004/066095 | 8/2004 |
| WO | WO 2005/015257 | 2/2005 |

OTHER PUBLICATIONS

Search Report (Application No. 07007550.2) dated Aug. 27, 2007.
Chinese Office Action (Application No. 200710136690.3) Dated Feb. 16, 2011.

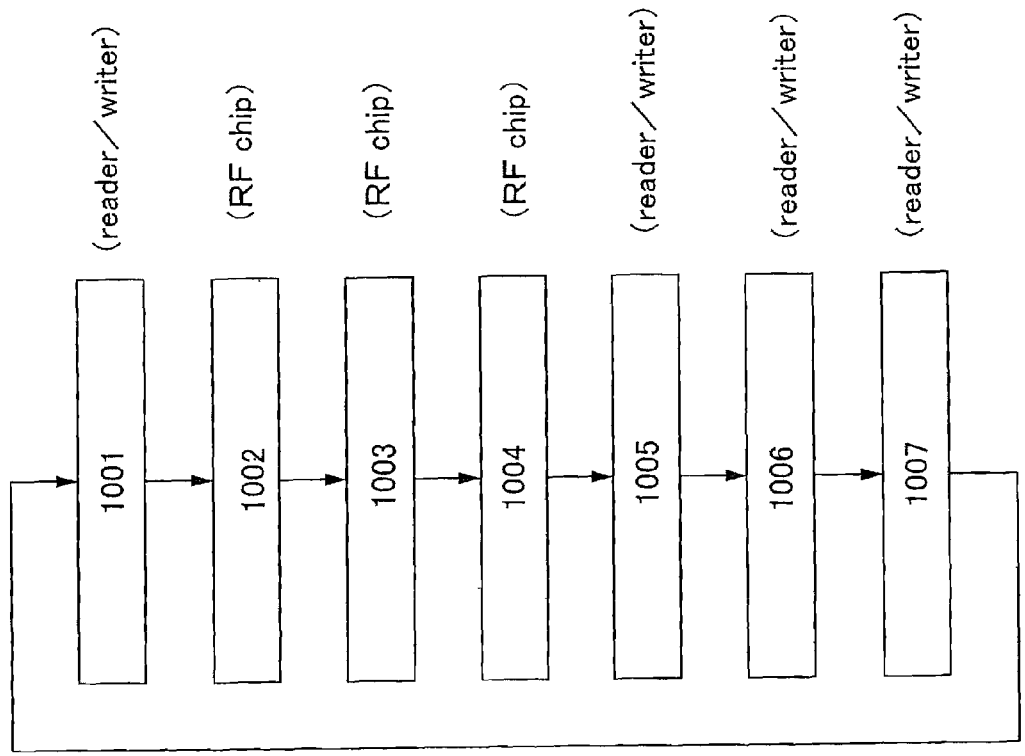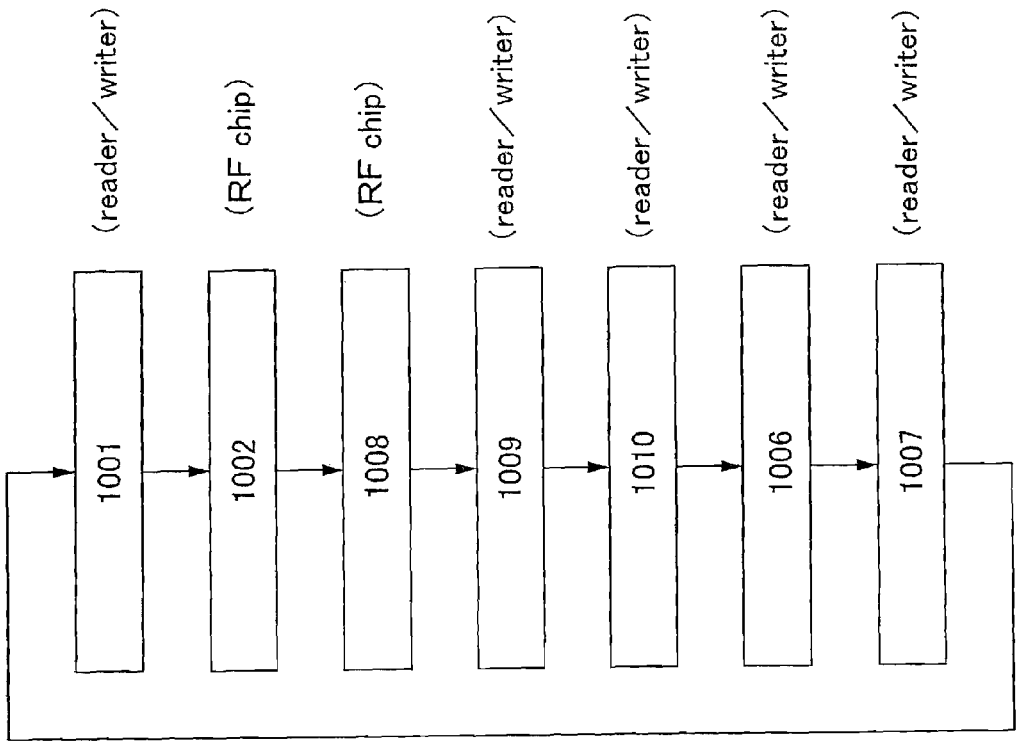

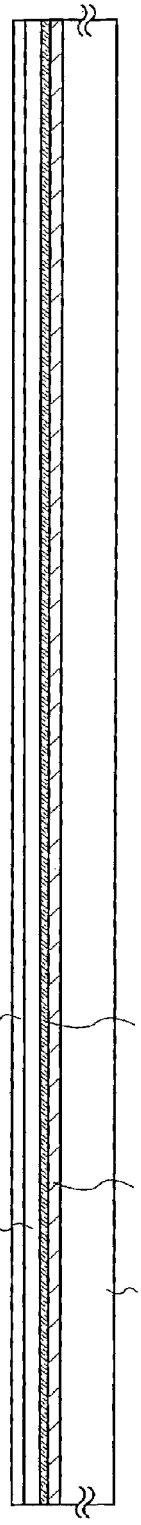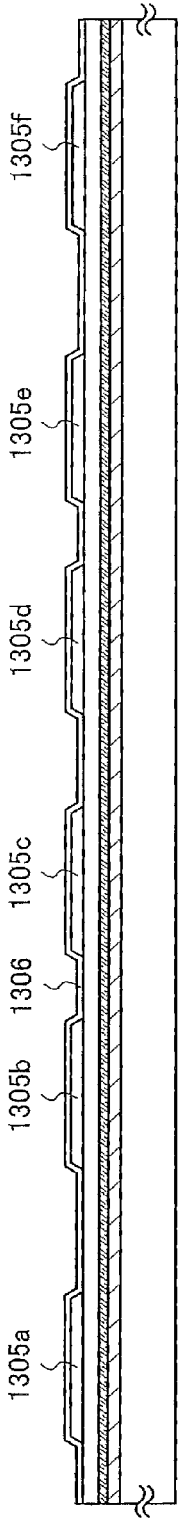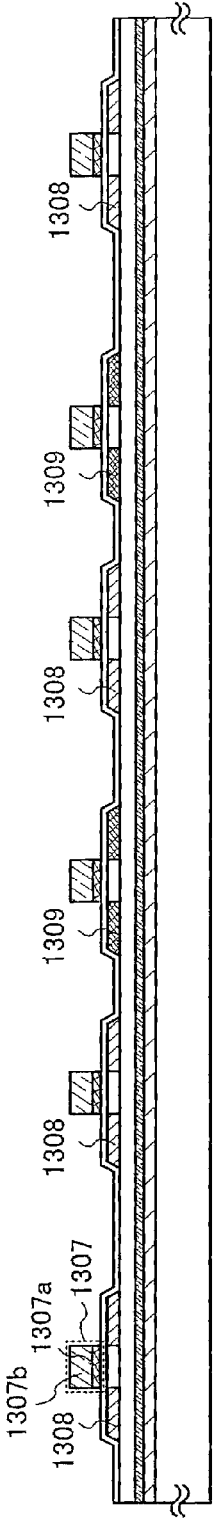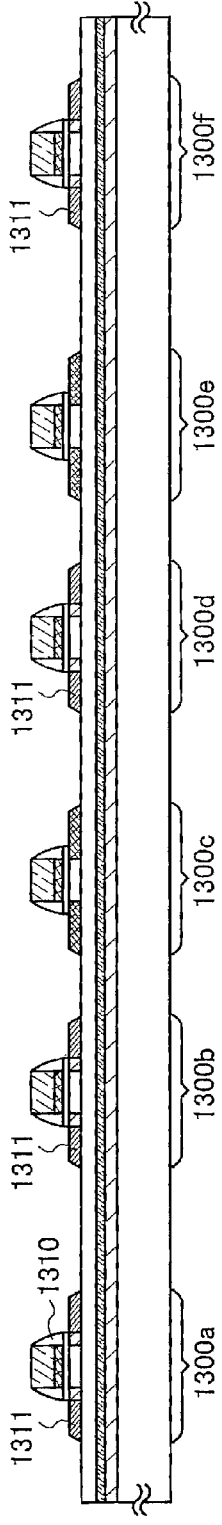

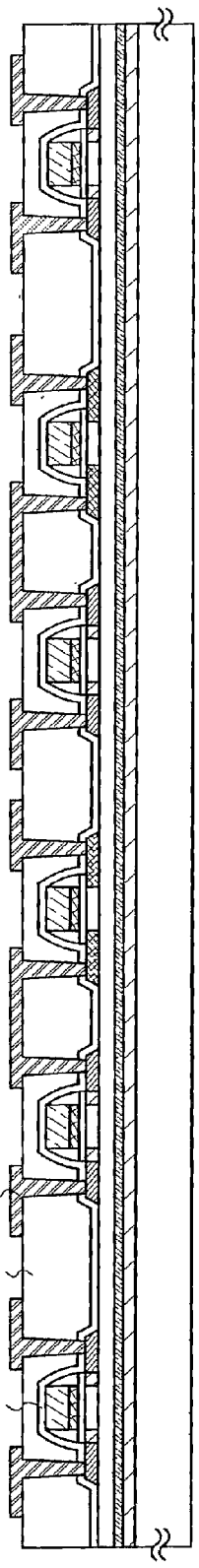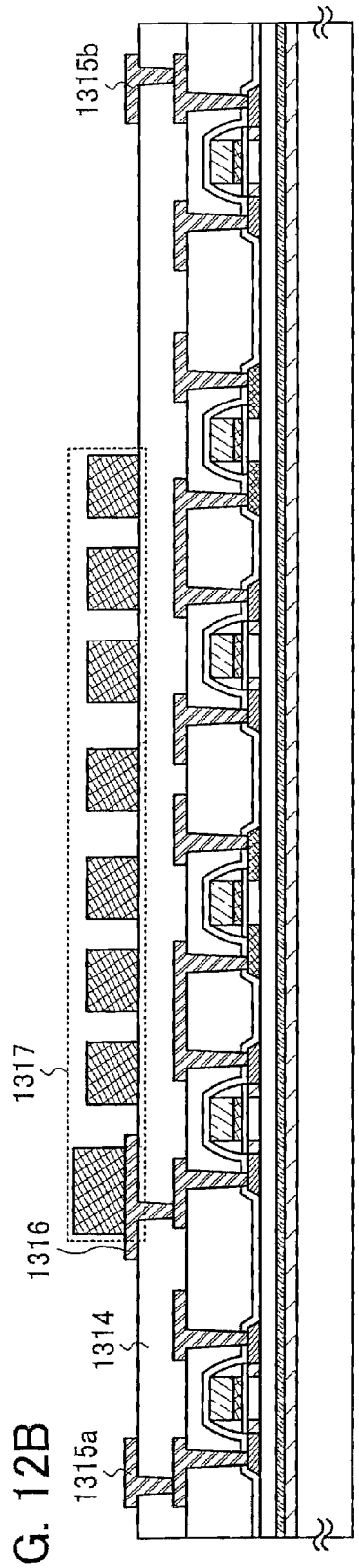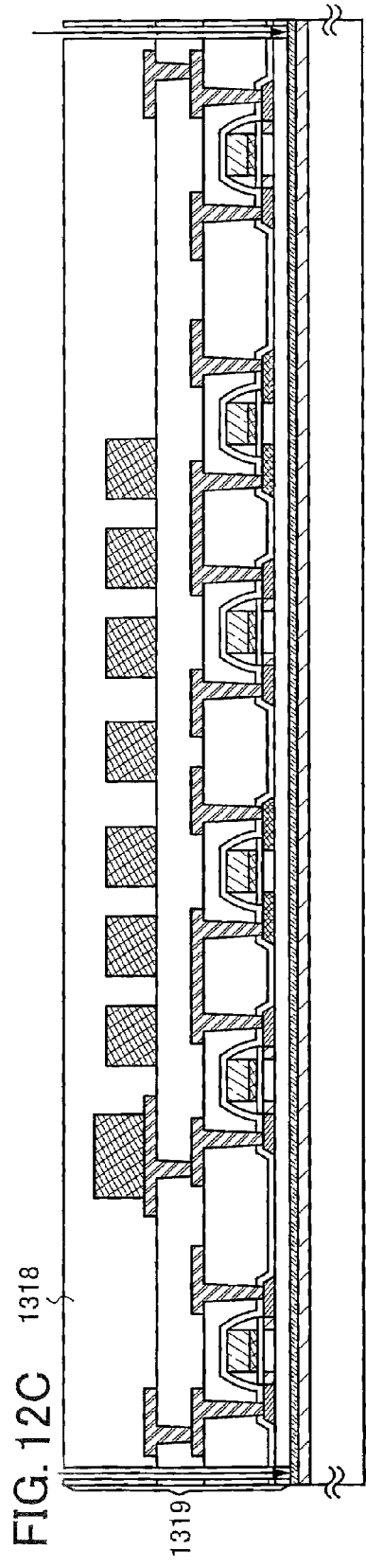

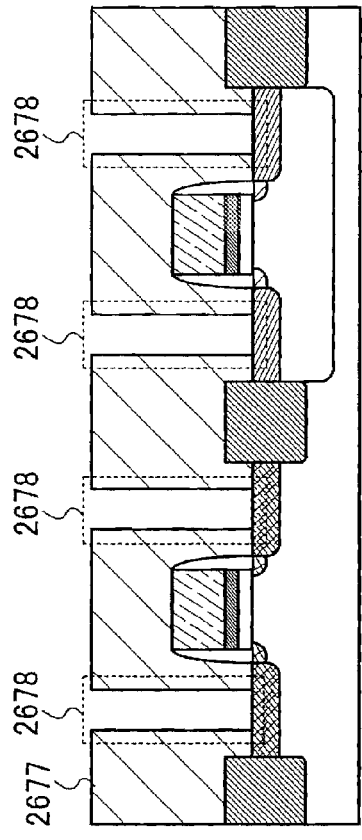
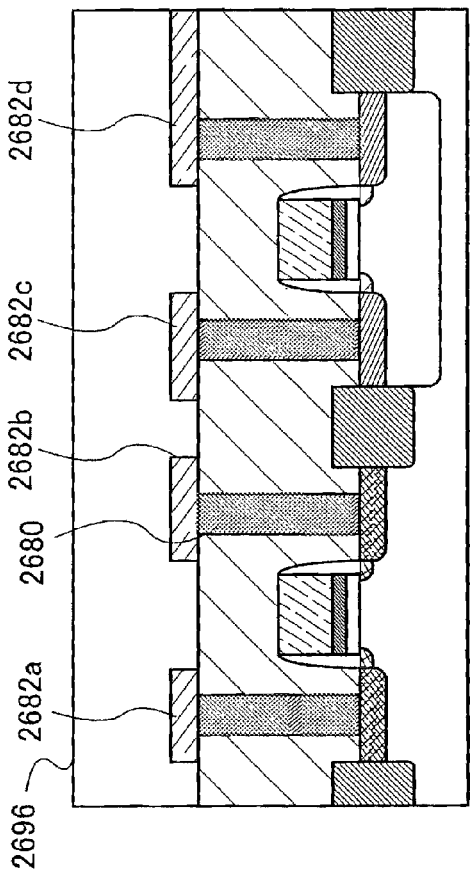
FIG. 20A
FIG. 20B

POSITION INFORMATION DETECTION SYSTEM AND POSITION INFORMATION DETECTION METHOD

This application is a Continuation of application Ser. No. 11/819,578 filed Jun. 28, 2007.

BACKGROUND OF THE INVENTION

1. Field of the Invention

The present invention relates to a position information detection system using a semiconductor device, which transmits and receives data by a radio signal.

2. Description of the Related Art

In recent years, a small semiconductor device in which a ultra-small IC chip and an antenna for wireless communication are combined with each other (hereinafter also referred to as a semiconductor device or an RF chip, and also called an RFID tag, a wireless tag, an ID tag, or an RF tag) has attracted attention. The semiconductor device can transmit and receive data without contact, for example, write data or read data, by transmission and reception of a radio signal (operating magnetic field) with use of a wireless communication device (hereinafter also referred to as a reader/writer).

As an application field of a semiconductor device which transmits and receives data by a radio signal, product management in the distribution industry is given as an example. Product management using a bar code and the like is the mainstream at present; however, since bar codes are read optically, data cannot be read in some cases when an interrupting object exists. On the other hand, when data is transmitted and received without contact with use of a wireless communication device, data of the semiconductor device is read wirelessly; thus, data can be read even when an interrupting object exists, if the interrupting object allows a wireless communication signal to pass through. Accordingly, improvement in efficiency, cost reduction, and the like of product management are expected. Further, wide range of applications including boarding passes, airplane tickets, and automatic payment of fares are expected (see Patent Document 1: Japanese Published Patent Application No. 2000-149194). A system such that people and objects are identified and managed by a small semiconductor device which transmits and receives data by wireless communication is called Radio Frequency IDentification (RFID), and has attracted attention as fundamental technology of the IT society.

Further, in recent years, research on technology in which a physical position of an RF chip is detected and a place of a product to which the RF chip is attached is specified in addition to transmission and reception of data by a radio signal has also been conducted. If the technology for detecting a physical position is developed, an effect such as shortening of time to look for things in a warehouse can be expected, for example. Further, a product to which the RF chip is attached can be traced; thus, movement of a customer having the product can be known, and a possibility of providing high value-added service can be expected, for example.

As a detection method of a physical position of an RF chip, there is a Received Signal Strength Indicator (RSSI) method, which utilizes properties that a signal intensity of a radio signal is reduced in accordance with an increase in a distance from a signal source. The RSSI method is a method where a physical position of an RF chip is identified by calculating a distance from a detected signal intensity when a position of a reader/writer is known, the reader/writer is a source of a radio signal, and the RF chip is provided with a function to detect a signal intensity. Further, the RSSI method is a method where a physical position of an RF chip is identified by calculating a distance from a detected signal intensity when a position of the reader/writer is known, the RF chip is a source of a radio signal, and a reader/writer is provided with a function to detect a signal intensity.

SUMMARY OF THE INVENTION

However, in a position information detection system of the RSSI method and the like using an RF chip and a reader/writer, a distance longer than an actual distance is calculated when an obstruction is between the reader/writer and the RF chip, since a decrease in signal intensity is remarkable. Therefore, the position information detection system of the RSSI method and the like using the RF chip and the reader/writer is needed to be used in an environment in which a radio signal is stable.

Further, in the position information detection system of the RSSI method and the like using the RF chip and the reader/writer, a distance shorter than an actual distance is calculated when a reflective object exists, since a radio signal is transmitted over a long distance without a decrease in signal intensity. An obstruction and a reflective object are not only objects of which position and/or shape is/are fixed, such as a desk and a shelf, but also objects of which position and/or shape is/are changed over time, such as a human body and a chair. Therefore, position information detection with high precision has been very difficult in a real environment.

In view of the foregoing problems, the invention is to provide a position information detection system of which position detection precision can be improved even in an environment in which an obstruction and a reflective object exist.

A position information detection system of the invention using an RF chip includes a reader/writer of which physical position is known, a first RF chip of which physical position is known, and a second RF chip which is attached to an object of which physical position information is to be detected; and has a function to calculate a physical distance between the reader/writer and the second RF chip from a first calculated distance between the reader/writer and the first RF chip, which is calculated from a signal intensity of a radio signal of which source is the reader/writer when being regularly detected by the first RF chip, a second calculated distance between the second RF chip and the reader/writer, which is calculated from a signal intensity of a radio signal of which source is the reader/writer when being detected by the second RF chip, and a physical distance between the reader/writer and the first RF chip.

Another position information detection system of the invention using an RF chip includes a reader/writer of which physical position is known, a first RF chip of which physical position is known, and a second RF chip which is attached to an object of which physical position information is to be detected; and has a function to calculate a physical distance between the reader/writer and the second RF chip from a first calculated distance between the reader/writer and the first RF chip, which is calculated from a signal intensity of a radio signal of which source is the first RF chip when being regularly detected by the reader/writer, a second calculated distance between the second RF chip and the reader/writer, which is calculated from a signal intensity of a radio signal of which source is the second RF chip when being detected by the reader/writer, and a physical distance between the reader/writer and the first RF chip.

One feature of the invention is a position information detection system using a semiconductor device, which includes a first semiconductor device, a second semiconductor device, and a wireless communication device which transmits and receives data by transmission and reception of a radio signal to/from the first semiconductor device and the second semiconductor device. The first semiconductor device has a function to detect a first signal intensity of a radio signal received from the wireless communication device, a function to calculate a first calculated distance from the first signal intensity, and a function to transmit data on the first calculated distance to the wireless communication device. The second semiconductor device has a function to detect a second signal intensity of a radio signal received from the wireless communication device, a function to calculate a second calculated distance from the second signal intensity, and a function to transmit data on the second calculated distance to the wireless communication device. The wireless communication device has a function to calculate a position of the second semiconductor device from the first calculated distance, the second calculated distance, a position of the first semiconductor device, and a position of the wireless communication device.

Another feature of the invention is a position information detection system using a semiconductor device, which includes a first semiconductor device, a second semiconductor device, and a wireless communication device which transmits and receives data by transmission and reception of a radio signal to/from the first semiconductor device and the second semiconductor device. The first semiconductor device has a function to detect a first signal intensity of a radio signal received from the wireless communication device and a function to transmit data on the first signal intensity to the wireless communication device. The second semiconductor device has a function to detect a second signal intensity of a radio signal received from the wireless communication device and a function to transmit data on the second signal intensity to the wireless communication device. The wireless communication device has a function to calculate a first calculated distance from the first signal intensity, a function to calculate a second calculated distance from the second signal intensity, and a function to calculate a position of the second semiconductor device from the first calculated distance, the second calculated distance, a position of the first semiconductor device, and a position of the wireless communication device.

Another feature of the invention is a position information detection system using a semiconductor device, which includes a first semiconductor device, a second semiconductor device, and a wireless communication device which transmits and receives data by transmission and reception of a radio signal to/from the first semiconductor device and the second semiconductor device. The wireless communication device has a function to detect a first signal intensity of a radio signal received from the first semiconductor device, a function to calculate a first calculated distance from the first signal intensity, a function to detect a second signal intensity of a radio signal received from the second semiconductor device, a function to calculate a second calculated distance from the second signal intensity, and a function to calculate a position of the second semiconductor device from the first calculated distance, the second calculated distance, a position of the first semiconductor device, and a position of the wireless communication device.

The wireless communication device may have a function to compare the first calculated distance with the position of the first semiconductor device, and a function to calculate the position of the second semiconductor device from the second calculated distance and the position of the wireless communication device, based on a comparison of the first calculated distance with the position of the first semiconductor device.

Another feature of the invention is a position information detection method, which includes transmitting a first radio signal from a wireless communication device to a first semiconductor device, and transmitting a second radio signal from the wireless communication device to a second semiconductor device; receiving the first radio signal and detecting a first signal intensity of the first radio signal in the first semiconductor device, and receiving the second radio signal and detecting a second signal intensity of the second radio signal in the second semiconductor device; calculating a first calculated distance from the first signal intensity in the first semiconductor device, and calculating a second calculated distance from the second signal intensity in the second semiconductor device; transmitting data on the first calculated distance from the first semiconductor device to the wireless communication device, and transmitting data on the second calculated distance from the second semiconductor device to the wireless communication device; receiving data on the first signal intensity, comparing the first calculated distance with a position of the first semiconductor device, and determining a correction method of a calculated distance based on a comparison of the first calculated distance with a position of the first semiconductor device, in the wireless communication device; and receiving data on the second calculated distance and calculating a position of the second semiconductor device from the second calculated distance and a position of the wireless communication device, based on the correction method, in the wireless communication device.

Another feature of the invention is a position information detection method, which includes transmitting a first radio signal from a wireless communication device to a first semiconductor device, and transmitting a second radio signal from the wireless communication device to a second semiconductor device; receiving the first radio signal and detecting a first signal intensity of the first radio signal in the first semiconductor device, and receiving the second radio signal and detecting a second signal intensity of the second radio signal in the second semiconductor device; transmitting data on the first signal intensity from the first semiconductor device to the wireless communication device, and transmitting data on the second signal intensity from the second semiconductor device to the wireless communication device; receiving data on the first signal intensity, calculating a first calculated distance from the first signal intensity, comparing the first calculated distance with a position of the first semiconductor device, and determining a correction method of a calculated distance based on a comparison of the first calculated distance with a position of the first semiconductor device, in the wireless communication device; and receiving data on the second signal intensity, calculating a second calculated distance from the second signal intensity and calculating a position of the second semiconductor device from the second calculated distance and a position of the wireless communication device, based on the correction method, in the wireless communication device.

Another feature of the invention is a position information detection method, which includes transmitting a first radio signal from a first semiconductor device to a wireless communication device, and transmitting a second radio signal from a second semiconductor device to the wireless communication device; receiving the first radio signal and detecting a first signal intensity of the first radio signal, and receiving the second radio signal and detecting a second signal intensity of the second radio signal, in the wireless communication device; calculating a first calculated distance from the first signal intensity, comparing the first calculated distance with a position of the first semiconductor device, and determining a correction method of a calculated distance based on a comparison of the first calculated distance with a position of the first semiconductor device, in the wireless communication device; and calculating a second calculated distance from the second signal intensity, and calculating a position of the second semiconductor device, from the second calculated distance and a position of the wireless communication device, based on the correction method, in the wireless communication device.

With the above-described structure, a position information detection system and method using an RF chip can be provided, of which position detection precision can be improved even in an environment in which an obstruction or a reflective object exists and a position and/or a shape of the obstruction or the reflective object is/are changed over time.

The positions of the wireless communication device, the first semiconductor device, and the second semiconductor device may be determined based on the same appropriate position. The first semiconductor device or the second semiconductor device may have a function that a power supply voltage is supplied from the radio signal. The first semiconductor device, the second semiconductor device, or the wireless communication device may be formed using a transistor including a semiconductor film provided over a substrate. Note that the substrate may be any of a glass substrate, a quartz substrate, and a plastic substrate. The first semiconductor device, the second semiconductor device, or the wireless communication device may be formed using a transistor using an SOI substrate.

According to the invention, a position information detection system using an RF chip can be provided, of which position detection precision can be improved even in an environment in which an obstruction or a reflective object exists and a position and/or a shape of the obstruction or the reflective object is/are changed over time.

BRIEF DESCRIPTION OF THE DRAWINGS

FIGS. 10A and 10B are flow charts of position detection operation of a position information detection system of the invention using an RF chip.

FIGS. 11A to 11D are diagrams showing a structure of Embodiment 2 using the invention.

FIGS. 12A to 12C are diagrams showing a structure of Embodiment 2 using the invention.

FIGS. 20A and 20B are diagrams showing a structure of Embodiment 4 using the invention.

DETAILED DESCRIPTION OF THE INVENTION

Figure 1:
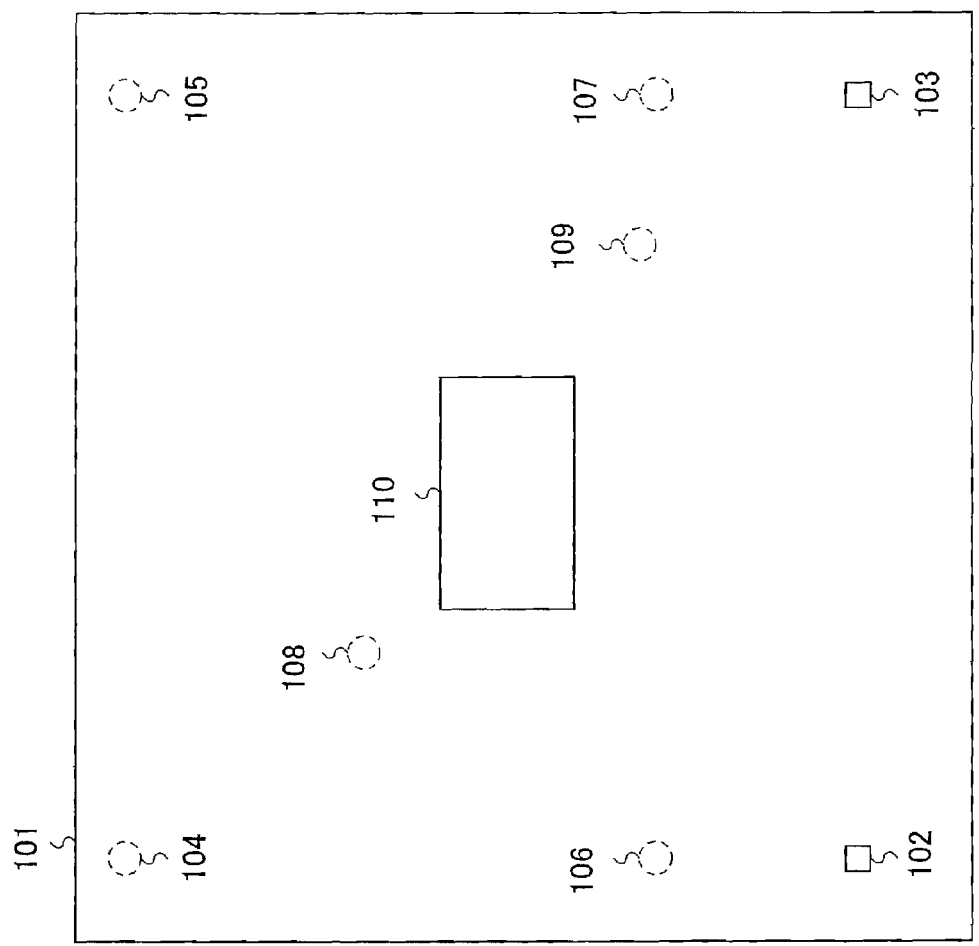
FIG. 1 is a configuration diagram of a position information detection system of the invention using an RF chip.

Hereinafter, embodiment modes of the present invention will be described with reference to drawings. However, the present invention can be embodied in many different modes and it is easily understood by those skilled in the art that modes and details can be variously changed without departing from the scope and the spirit of the present invention. Therefore, the present invention is not construed as being limited to description of the embodiment modes. Note that in all the drawings for describing the embodiment modes, the same portions or portions having similar functions are denoted by the same reference numerals, and repeated description is omitted.

An embodiment mode of a position information detection system of the invention using an RF chip is described with reference to FIG. 1. FIG. 1 shows a system configuration of a position information detection system of the invention using an RF chip.

FIG. 1 shows a room 101 provided with a position information detection system of the invention using an RF chip, a first reader/writer 102 and a second reader/writer 103 of which installation positions are known, a first RF chip 104, a second RF chip 105, a third RF chip 106, and a fourth RF chip 107 of which installation positions are known, a first detection position 108 and a second detection position 109 in which objects of which physical position information is to be detected and to which RF chips are attached exist, and an obstruction 110 which interferes with transmission of a radio signal.

Next, a position detection method by a position information detection system of the invention using an RF chip is described. First, a position detection method in an ideal environment, in which the obstruction 110 does not exist, is described with reference to FIGS. 2 to 4.

Figure 2:
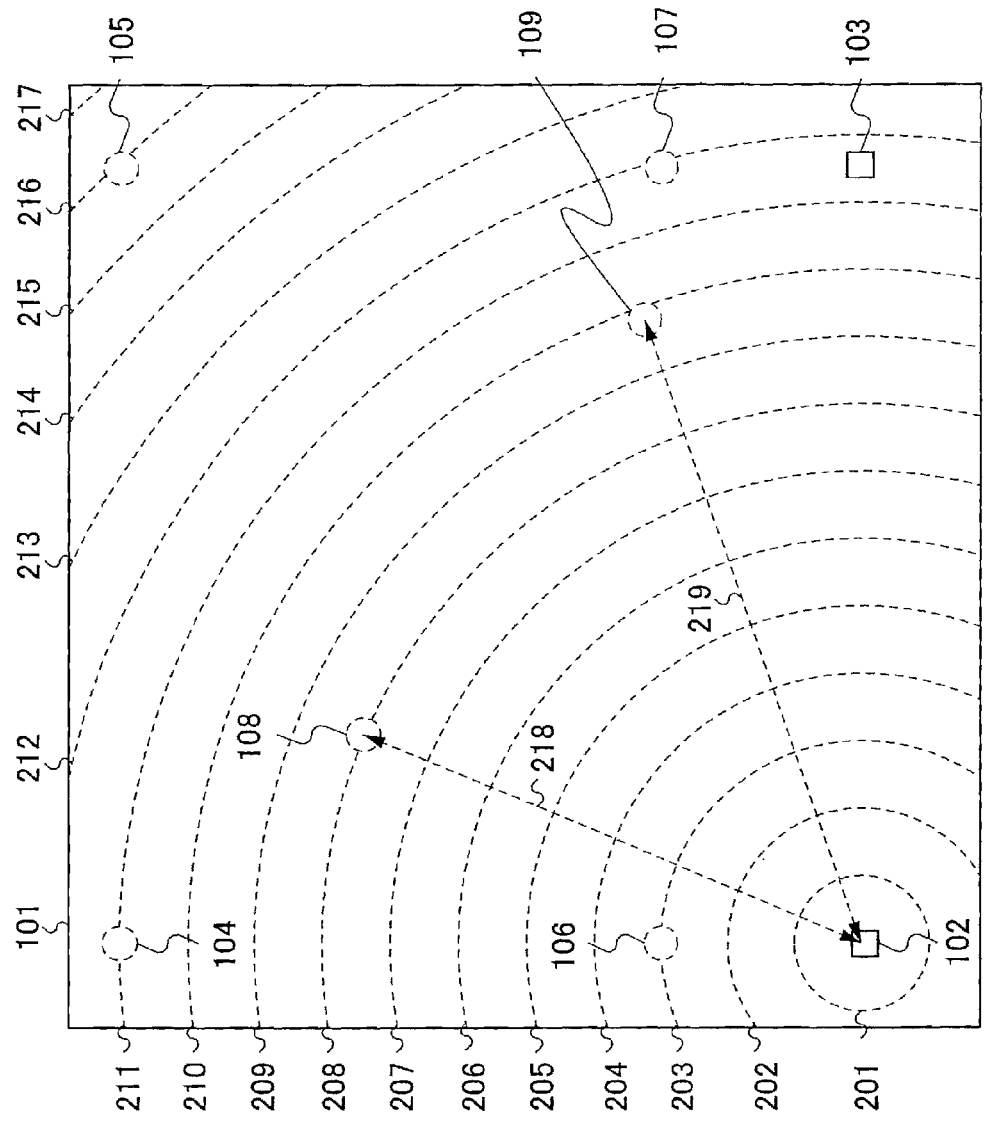
FIG. 2 is a diagram showing electric wave intensity distribution when a position information detection system of the invention using an RF chip is provided in an ideal environment.

FIG. 2 shows dotted lines which are obtained by connecting points where a radio signal transmitted from the first reader/writer 102 has first to seventeenth signal intensities, that is, a first iso-signal intensity line 201, a second iso-signal intensity line 202, a third iso-signal intensity line 203, a fourth iso-signal intensity line 204, a fifth iso-signal intensity line 205, a sixth iso-signal intensity line 206, a seventh iso-signal intensity line 207, an eighth iso-signal intensity line 208, a ninth iso-signal intensity line 209, a tenth iso-signal intensity line 210, an eleventh iso-signal intensity line 211, a twelfth iso-signal intensity line 212, a thirteenth iso-signal intensity line 213, a fourteenth iso-signal intensity line 214, a fifteenth iso-signal intensity line 215, a sixteenth iso-signal intensity line 216, and a seventeenth iso-signal intensity line 217. Note that distances between the first reader/writer 102 and each of the first detection position 108 and the second detection position 109 are a first distance 218 and a second distance 219 respectively.

Figure 3:
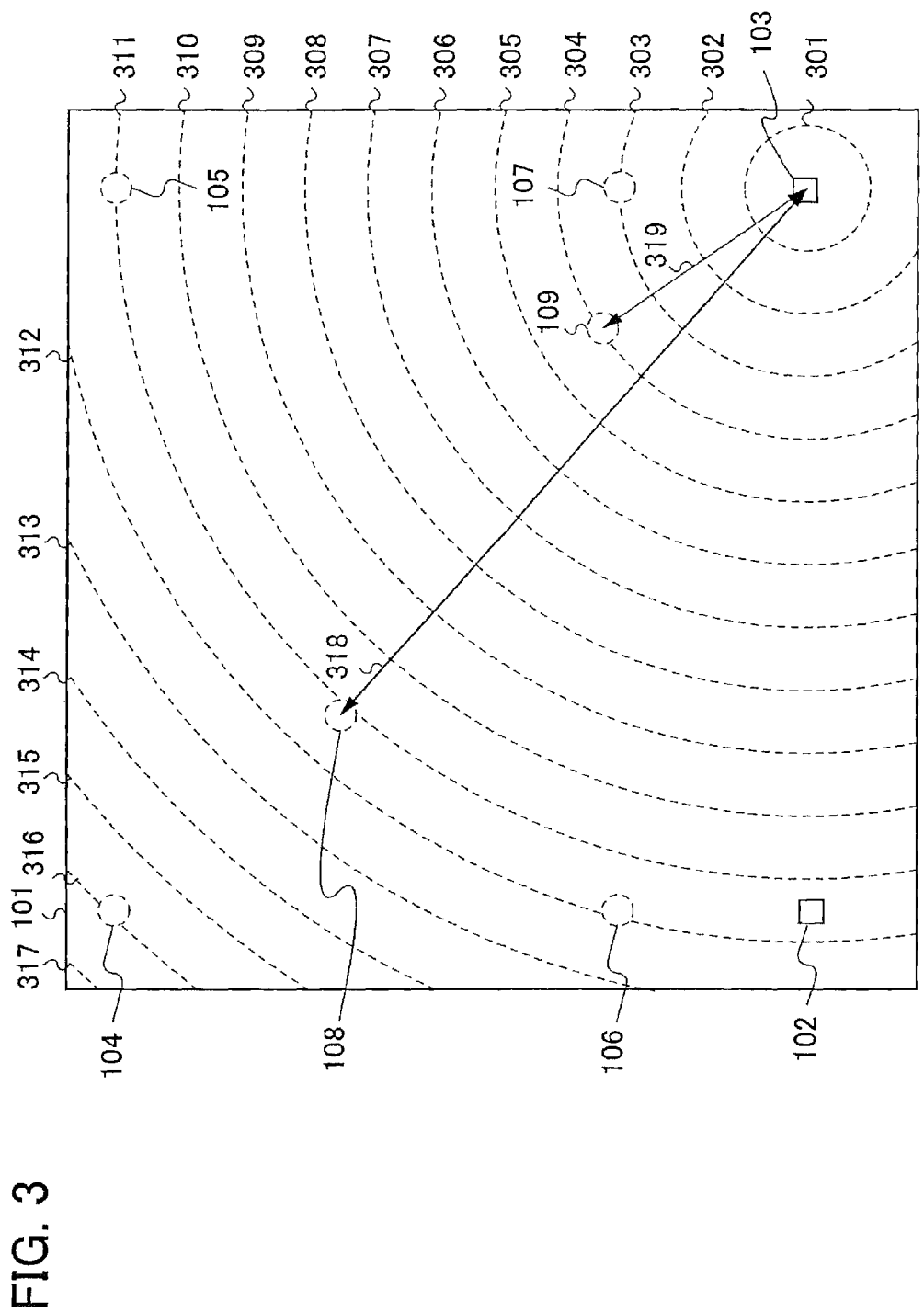
FIG. 3 is a diagram showing electric wave intensity distribution when a position information detection system of the invention using an RF chip is provided in an ideal environment.

Similarly, FIG. 3 shows dotted lines which are obtained by connecting points where a radio signal transmitted from the second reader/writer 103 has eighteenth to thirty-fourth signal intensities, that is, an eighteenth iso-signal intensity line 301, a nineteenth iso-signal intensity line 302, a twentieth iso-signal intensity line 303, a twenty-first iso-signal intensity line 304, a twenty-second iso-signal intensity line 305, a twenty-third iso-signal intensity line 306, a twenty-fourth iso-signal intensity line 307, a twenty-fifth iso-signal intensity line 308, a twenty-sixth iso-signal intensity line 309, a twenty-seventh iso-signal intensity line 310, a twenty-eighth iso-signal intensity line 311, a twenty-ninth iso-signal intensity line 312, a thirtieth iso-signal intensity line 313, a thirty-first iso-signal intensity line 314, a thirty-second iso-signal intensity line 315, a thirty-third iso-signal intensity line 316, and a thirty-fourth iso-signal intensity line 317. Note that distances between the second reader/writer 103 and each of the first detection position 108 and the second detection position 109 are a third distance 318 and a fourth distance 319 respectively.

Figure 4:
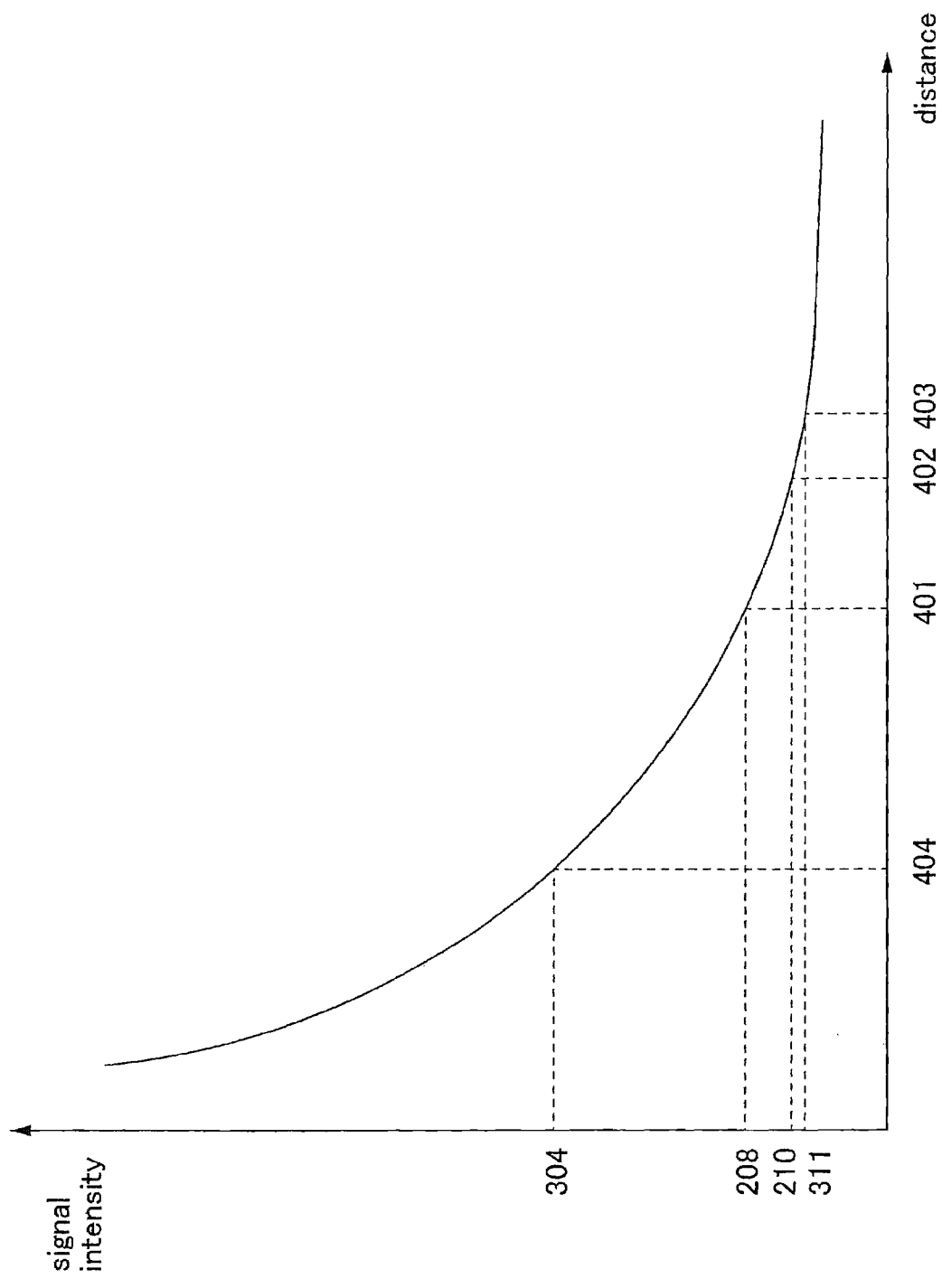
FIG. 4 is a diagram showing a relationship between a distance and a signal intensity of a radio signal.

FIG. 4 shows a relationship between a distance from the reader/writer to the RF chip and a signal intensity of a radio signal transmitted from the reader/writer in an ideal environment, in which an obstruction and a reflective object do not exist. In FIG. 4, as the distance increases, the signal intensity decreases. That is, when the distance is set, the signal intensity can be specified. Further, when the signal intensity is set, the distance can be specified.

The first RF chip 104, the second RF chip 105, the third RF chip 106, and the fourth RF chip 107 each have a function to detect a signal intensity of a radio signal and calculate a distance from the detected signal intensity by using the relationship between the distance and the signal intensity shown in FIG. 4. The installation positions of the first reader/writer 102, the second reader/writer 103, the first RF chip 104, the second RF chip 105, the third RF chip 106, and the fourth RF chip 107 are known. Accordingly, the first reader/writer 102 includes, as data, a distance from the first reader/writer 102 to each of the first RF chip 104, the second RF chip 105, the third RF chip 106, and the fourth RF chip 107. The second reader/writer 103 includes, as data, a distance from the second reader/writer 103 to each of the first RF chip 104, the second RF chip 105, the third RF chip 106, and the fourth RF chip 107.

First, position correction operation of a position information detection system of the invention using an RF chip is described. The first reader/writer 102 transmits a radio signal, and the first RF chip 104, the second RF chip 105, the third RF chip 106, and the fourth RF chip 107 detect a signal intensity. Then, the first RF chip 104, the second RF chip 105, the third RF chip 106, and the fourth RF chip 107 calculate a first calculated distance, a second calculated distance, a third calculated distance, and a fourth calculated distance from the detected signal intensity. The first RF chip 104, the second RF chip 105, the third RF chip 106, and the fourth RF chip 107 transmit the first calculated distance, the second calculated distance, the third calculated distance, and the fourth calculated distance as transmission data to the first reader/writer 102.

After receiving the first calculated distance, the second calculated distance, the third calculated distance, and the fourth calculated distance as reception data, the first reader/writer 102 compares the distances from the first reader/writer 102 to the first RF chip 104, the second RF chip 105, the third RF chip 106, and the fourth RF chip 107 with the first calculated distance, the second calculated distance, the third calculated distance, and the fourth calculated distance, respectively. Here, since the position information detection system of the invention using the RF chip is provided in an ideal environment, the first reader/writer 102 determines that the distances from the first reader/writer 102 to the first RF chip 104, the second RF chip 105, the third RF chip 106, and the fourth RF chip 107 are equal to the first calculated distance, the second calculated distance, the third calculated distance, and the fourth calculated distance. Therefore, the first reader/writer 102 determines that the calculated distances calculated by the first RF chip 104, the second RF chip 105, the third RF chip 106, and the fourth RF chip 107 are not needed to be corrected.

Similarly, the second reader/writer 103 transmits a radio signal, and the first RF chip 104, the second RF chip 105, the third RF chip 106, and the fourth RF chip 107 detect signal intensities. Then, the first RF chip 104, the second RF chip 105, the third RF chip 106, and the fourth RF chip 107 calculate a fifth calculated distance, a sixth calculated distance, a seventh calculated distance, and an eighth calculated distance from the detected signal intensities. The first RF chip 104, the second RF chip 105, the third RF chip 106, and the fourth RF chip 107 transmit the fifth calculated distance, the sixth calculated distance, the seventh calculated distance, and the eighth calculated distance as transmission data to the second reader/writer 103.

After receiving the fifth calculated distance, the sixth calculated distance, the seventh calculated distance, and the eighth calculated distance as reception data, the second reader/writer 103 compares the distances from the second reader/writer 103 to the first RF chip 104, the second RF chip 105, the third RF chip 106, and the fourth RF chip 107 with the fifth calculated distance, the sixth calculated distance, the seventh calculated distance, and the eighth calculated distance, respectively. Here, since the position information detection system of the invention using the RF chip is provided in an ideal environment, the second reader/writer 103 determines that the distances from the second reader/writer 103 to the first RF chip 104, the second RF chip 105, the third RF chip 106, and the fourth RF chip 107 are equal to the fifth calculated distance, the sixth calculated distance, the seventh calculated distance, and the eighth calculated distance. Therefore, the second reader/writer 103 determines that the calculated distances calculated by the first RF chip 104, the second RF chip 105, the third RF chip 106, and the fourth RF chip 107 are not needed to be corrected.

The above-described operation is the position correction operation of the position information detection system of the invention using the RF chip.

Next, position detection operation of a position information detection system of the invention using an RF chip is described.

Here, a first detection object in the first detection position 108 and a second detection object in the second detection position 109, to which a fifth RF chip and a sixth RF chip are attached respectively, are considered. Note that the fifth RF chip and the sixth RF chip each have a function to detect a signal intensity of a radio signal and calculate a distance from the detected signal intensity by using the relationship between the distance and the signal intensity shown in FIG. 4. Thus, the RF chip itself can calculate a distance between the reader/writer and the RF chip.

In FIG. 2, when the first reader/writer 102 transmits a radio signal, the fifth RF chip detects the eighth signal intensity on the eighth iso-signal intensity line 208 and calculates a ninth calculated distance 401 from FIG. 4. The sixth RF chip detects the tenth signal intensity on the tenth iso-signal intensity line 210 and calculates a tenth calculated distance 402 from FIG. 4. In FIG. 3, when the second reader/writer 103 transmits a radio signal, the fifth RF chip detects the twenty-eighth signal intensity on the twenty-eighth iso-signal intensity line 311 and calculates an eleventh calculated distance 403 from FIG. 4. The sixth RF chip detects the twenty-first signal intensity on the twenty-first iso-signal intensity line 304 and calculates a twelfth calculated distance 404 from FIG. 4.

Here, the ninth calculated distance 401 and the eleventh calculated distance 403 calculated by the fifth RF chip are transmitted as transmission data to the first reader/writer 102 and the second reader/writer 103 respectively. The first reader/writer 102 and the second reader/writer 103 receive data of the ninth calculated distance 401 and the eleventh calculated distance 403 and perform arithmetic processing by using the data, thereby to calculate a position of the fifth RF chip. Note that since in the previous position correction operation, the first reader/writer 102 and the second reader/writer 103 have determined that the calculated distances are not needed to be corrected, the calculated distance is not corrected.

The ninth calculated distance 401 and the eleventh calculated distance 403 are equal to the first distance 218 which is a distance from the first reader/writer 102 to the fifth RF chip and the third distance 318 which is a distance from the second reader/writer 103 to the fifth RF chip, respectively. Therefore, a first calculated position of the fifth RF chip calculated from the ninth calculated distance 401 and the eleventh calculated distance 403 corresponds to the first detection position 108. Accordingly, a position of the first detection object to which the fifth RF chip is attached is calculated as the first detection position 108.

In addition, the tenth calculated distance 402 and the twelfth calculated distance 404 calculated by the sixth RF chip are transmitted as transmission data to the first reader/writer 102 and the second reader/writer 103 respectively. The first reader/writer 102 and the second reader/writer 103 receive data of the tenth calculated distance 402 and the twelfth calculated distance 404 and perform arithmetic processing by using the data, thereby to calculate a position of the sixth RF chip. Note that since in the previous position correction operation, the first reader/writer 102 and the second reader/writer 103 have determined that the calculated distances are not needed to be corrected, the calculated distance is not corrected.

The tenth calculated distance 402 and the twelfth calculated distance 404 are equal to the second distance 219 which is a distance from the first reader/writer 102 to the sixth RF chip and the fourth distance 319 which is a distance from the second reader/writer 103 to the sixth RF chip, respectively. Therefore, a second calculated position of the sixth RF chip calculated from tenth calculated distance 402 and the twelfth calculated distance 404 corresponds to the second detection position 109. Accordingly, a position of the second detection object to which the sixth RF chip is attached is calculated as the second detection position 109.

The above-described operation is the position detection operation of the position information detection system of the invention using the RF chip.

As described above, position detection can be realized by the position information detection system of the invention using the RF chip.

Note that in this embodiment mode, the RF chip has a function to calculate a distance from a signal intensity; however, the reader/writer may have this function. In this case, the RF chip may have a function to detect a signal intensity and a function to transmit the detected signal intensity to the reader/writer as transmission data. When the reader/writer has a function to calculate a distance from a signal intensity, reductions in size and power consumption of the RF chip can be realized.

In addition, in this embodiment mode, the reader/writer has a function to calculate a position from a calculated distance; however, a server which is separately provided may have this function. When the server which is separately provided has a function to calculate a position from a calculated distance, reductions in size and power consumption of the reader/writer can be realized.

In addition, in this method, the RF chip detects a radio signal transmitted from the reader/writer; however, it is easily possible to employ a structure where the reader/writer detects a radio signal transmitted from the RF chip. Note that when the RF chip is a source of a radio signal and the reader/writer detects the radio signal, the RF chip may be provided with a battery. When the RF chip is provided with the battery, communication range can be increased. Further, the battery may be capable of being charged (a secondary battery), since the battery is not needed to be replaced.

Next, in the position information detection system of the invention using the RF chip, a position detection method in an environment in which the obstruction 110 exists is described with reference to FIGS. 5 to 7.

Figure 5:
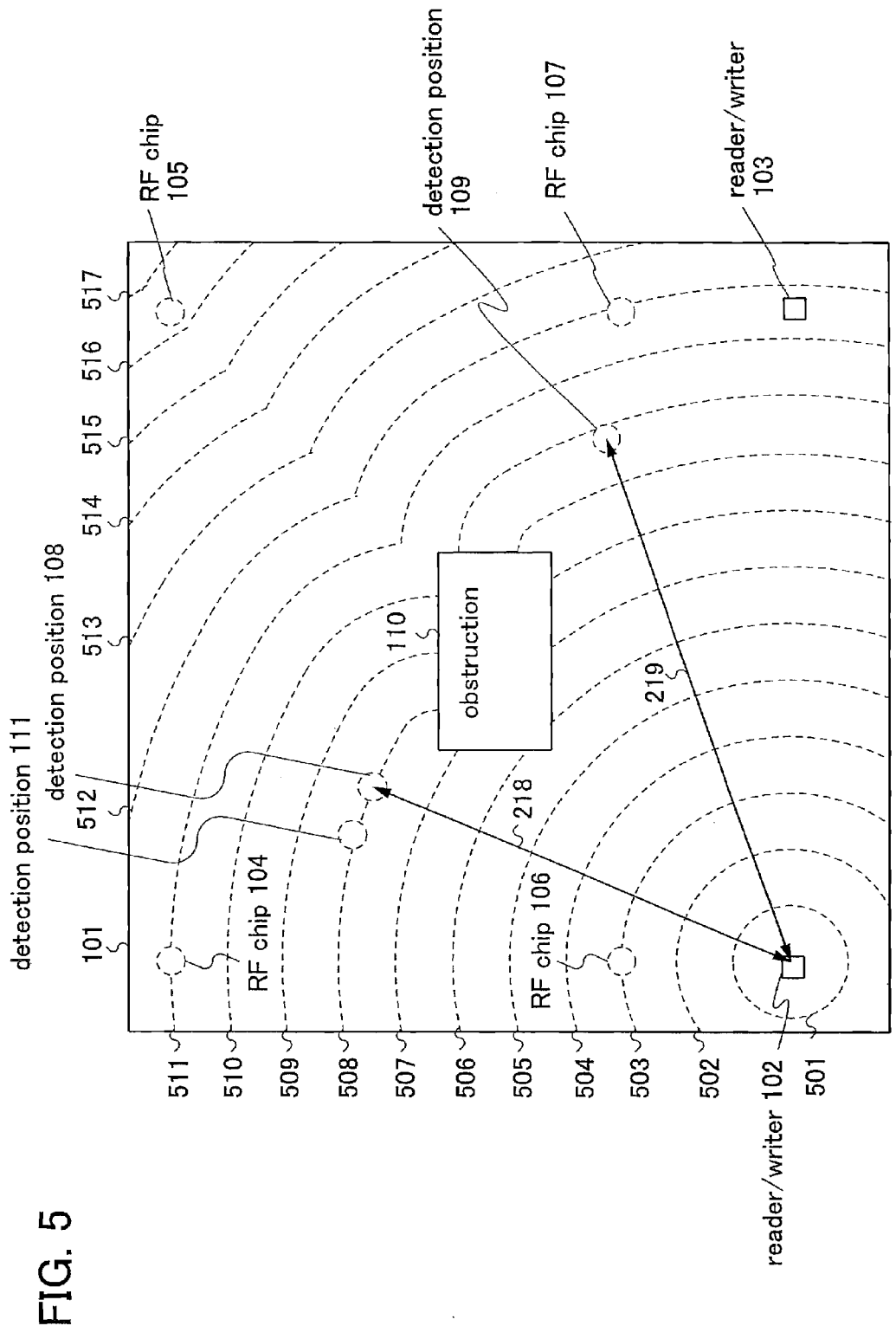
FIG. 5 is a diagram showing electric wave intensity distribution when a position information detection system of the invention using an RF chip is provided in an environment in which an obstruction exists.

FIG. 5 shows dotted lines which are obtained by connecting points where a radio signal transmitted from the first reader/writer 102 has thirty-fifth to fifty-first signal intensities, that is, a thirty-fifth iso-signal intensity line 501, a thirty-sixth iso-signal intensity line 502, a thirty-seventh iso-signal intensity line 503, a thirty-eighth iso-signal intensity line 504, a thirty-ninth iso-signal intensity line 505, a fortieth iso-signal intensity line 506, a forty-first iso-signal intensity line 507, a forty-second iso-signal intensity line 508, a forty-third iso-signal intensity line 509, a forty-fourth iso-signal intensity line 510, a forty-fifth iso-signal intensity line 511, a forty-sixth iso-signal intensity line 512, a forty-seventh iso-signal intensity line 513, a forty-eighth iso-signal intensity line 514, a forty-ninth iso-signal intensity line 515, a fiftieth iso-signal intensity line 516, and a fifty-first iso-signal intensity line 517. Here, since the obstruction 110 exists, the iso-signal intensity lines are twisted in a region between the second RF chip 105 and the obstruction 110. A signal intensity of the radio signal transmitted from the first reader/writer 102 and received by the second RF chip 105 is weaker than that in the case where the obstruction 110 does not exist. Note that distances between the first reader/writer 102 and each of the first detection position 108 and the second detection position 109 are the first distance 218 and the second distance 219 respectively.

Figure 6:
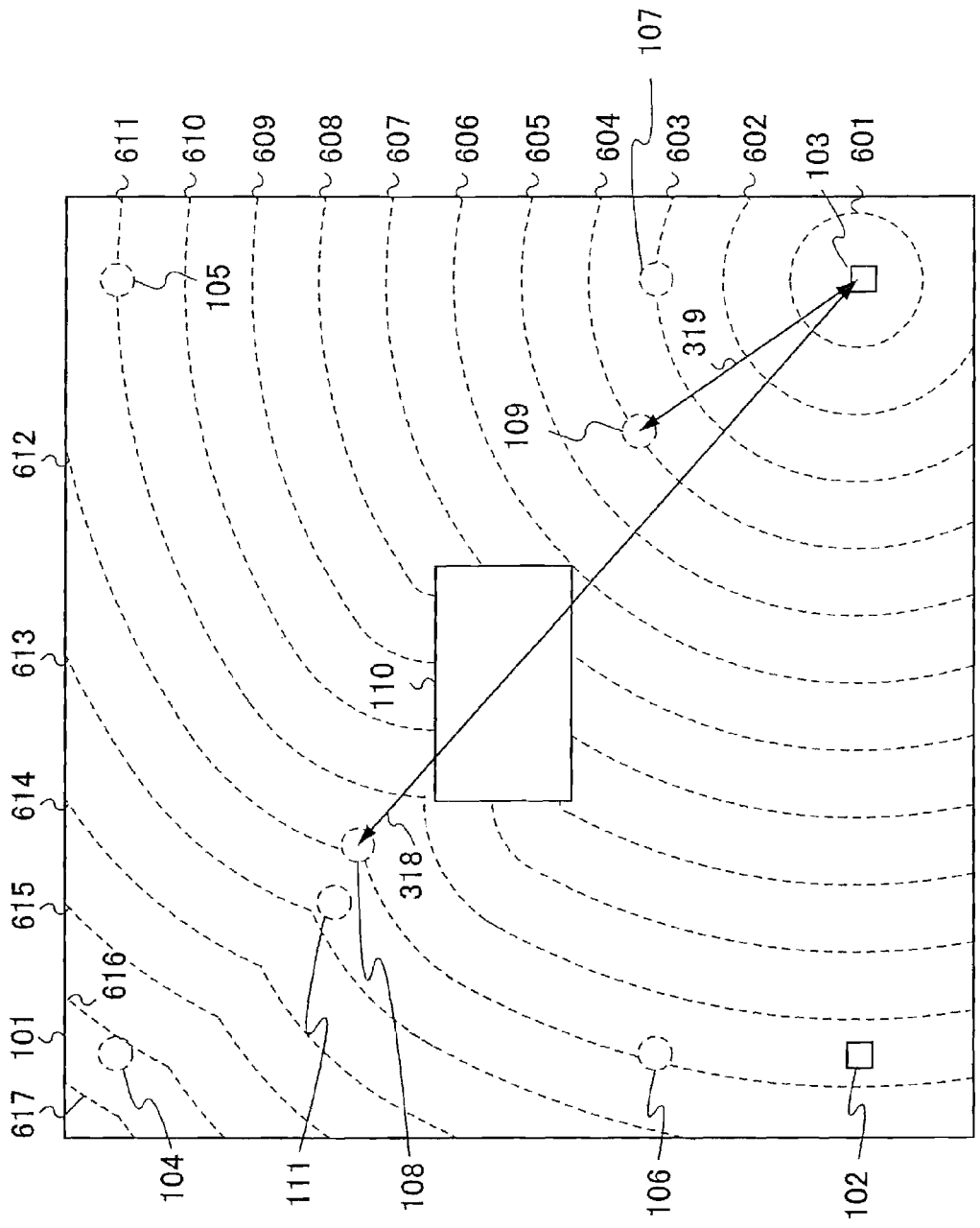
FIG. 6 is a diagram showing electric wave intensity distribution when a position information detection system of the invention using an RF chip is provided in an environment in which an obstruction exists.

Similarly, FIG. 6 shows dotted lines which are obtained by connecting points where a radio signal transmitted from the second reader/writer 103 has fifty-second to sixty-eighth signal intensities, that is, a fifty-second iso-signal intensity line 601, a fifty-third iso-signal intensity line 602, a fifty-fourth iso-signal intensity line 603, a fifty-fifth iso-signal intensity line 604, a fifty-sixth iso-signal intensity line 605, a fifty-seventh iso-signal intensity line 606, a fifty-eighth iso-signal intensity line 607, a fifty-ninth iso-signal intensity line 608, a sixtieth iso-signal intensity line 609, a sixty-first iso-signal intensity line 610, a sixty-second iso-signal intensity line 611, a sixty-third iso-signal intensity line 612, a sixty-fourth iso-signal intensity line 613, a sixty-fifth iso-signal intensity line 614, a sixty-sixth iso-signal intensity line 615, a sixty-seventh iso-signal intensity line 616, and a sixty-eighth iso-signal intensity line 617 are shown. Here, since the obstruction 110 exists, the iso-signal intensity lines are twisted in a region between the first RF chip 104 and the obstruction 110. A signal intensity of the radio signal transmitted from the second reader/writer 103 and received by the first RF chip 104 is weaker than that in the case where the obstruction 110 does not exist. Note that distances between the second reader/writer 103 and each of the first detection position 108 and the second detection position 109 are the third distance 318 and the fourth distance 319 respectively.

Figure 7:
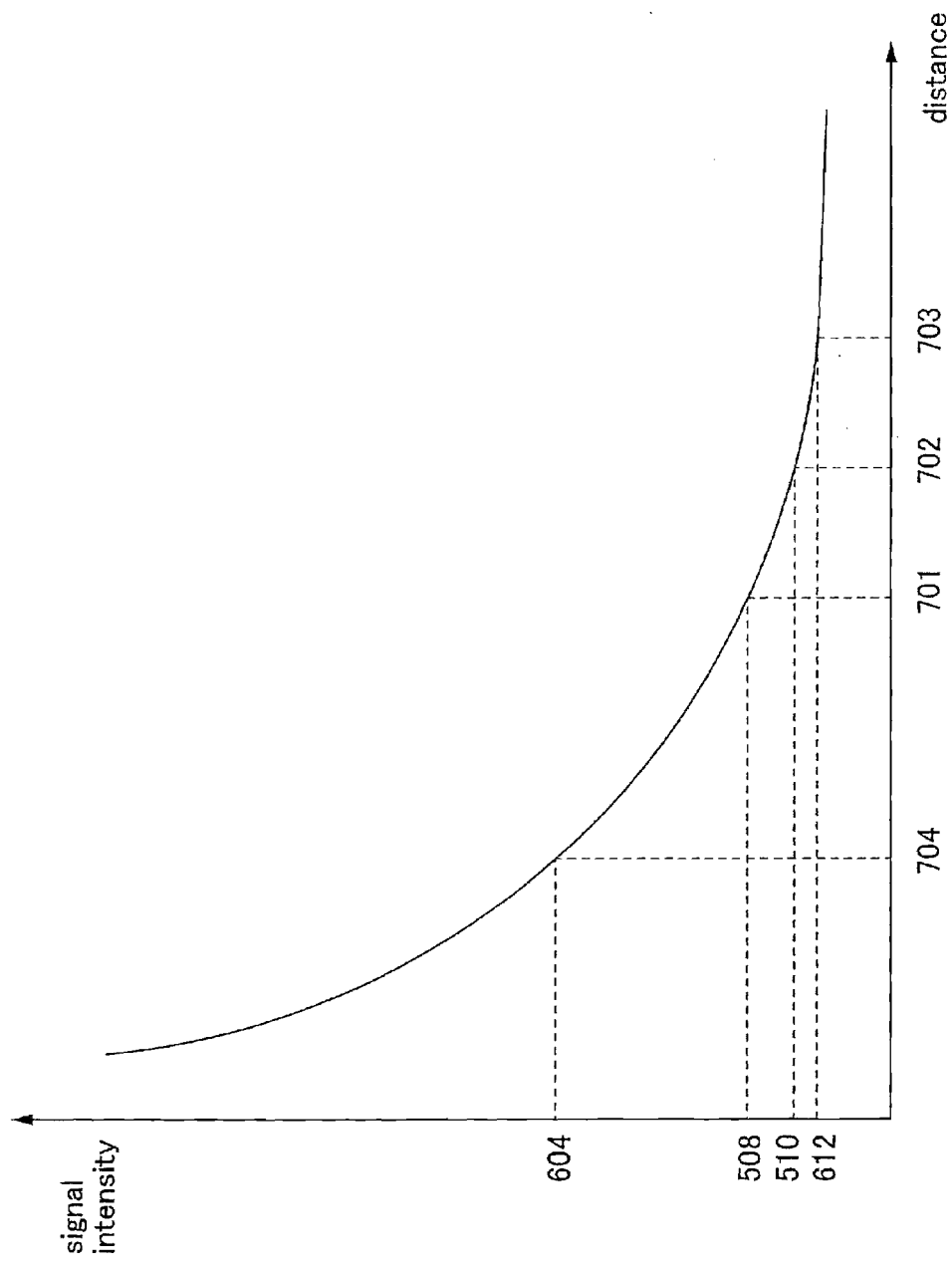
FIG. 7 is a diagram showing a relationship between a distance and a signal intensity of a radio signal.

FIG. 7 equivalent to FIG. 4 shows a relationship between a distance from the reader/writer to the RF chip and a signal intensity of a radio signal transmitted from the reader/writer in an environment in which the obstruction exists. In FIG. 7, as the distance increases, the signal intensity decreases similarly in FIG. 4. That is, when the distance is set, the signal intensity can be specified. Further, when the signal intensity is set, the distance can be specified.

The first RF chip 104, the second RF chip 105, the third RF chip 106, and the fourth RF chip 107 each have a function to detect a signal intensity of a radio signal and calculate a distance from the detected signal intensity by using the relationship between the distance and the signal intensity shown in FIG. 7. The installation positions of the first reader/writer 102, the second reader/writer 103, the first RF chip 104, the second RF chip 105, the third RF chip 106, and the fourth RF chip 107 are known. Accordingly, the first reader/writer 102 includes, as data, a distance from the first reader/writer 102 to each of the first RF chip 104, the second RF chip 105, the third RF chip 106, and the fourth RF chip 107. The second reader/writer 103 includes, as data, a distance from the second reader/writer 103 to each of the first RF chip 104, the second RF chip 105, the third RF chip 106, and the fourth RF chip 107.

First, position correction operation of a position information detection system of the invention using an RF chip is described. The first reader/writer 102 transmits a radio signal, and the first RF chip 104, the second RF chip 105, the third RF chip 106, and the fourth RF chip 107 detect a signal intensity. Then, the first RF chip 104, the second RF chip 105, the third RF chip 106, and the fourth RF chip 107 calculate thirteenth to sixteenth calculated distances from the detected signal intensity. Note that since the signal intensity detected by the second RF chip 105 is weaker than that in the case where the obstruction 110 does not exist, the fourteenth calculated distance is calculated to be longer than an actual distance. The first RF chip 104, the second RF chip 105, the third RF chip 106, and the fourth RF chip 107 transmit the thirteenth to sixteenth calculated distances as transmission data to the first reader/writer 102.

After receiving the thirteenth to sixteenth calculated distances as reception data, the first reader/writer 102 compares the distance from the first reader/writer 102 to each of the first RF chip 104, the second RF chip 105, the third RF chip 106, and the fourth RF chip 107; and the thirteenth to sixteenth calculated distances. Here, the first reader/writer 102 determines that the distances from the first reader/writer 102 to each of the first RF chip 104, the third RF chip 106, and the fourth RF chip 107 are equal to the thirteenth calculated distance, the fifteenth calculated distance, and the sixteenth calculated distance. On the other hand, the first reader/writer 102 determines that the fourteenth calculated distance is longer than the distance from the first reader/writer 102 to the second RF chip 105. That is, the first reader/writer 102 determines that the distance from the first reader/writer 102 to the second RF chip 105 is needed to be corrected to be shorter than the calculated distance.

Similarly, the second reader/writer 103 transmits a radio signal, and the first RF chip 104, the second RF chip 105, the third RF chip 106, and the fourth RF chip 107 detect a signal intensity. Then, the first RF chip 104, the second RF chip 105, the third RF chip 106, and the fourth RF chip 107 calculate seventeenth to twentieth calculated distances from the detected signal intensity. Note that since the signal intensity detected by the first RF chip 104 is weaker than that in the case where the obstruction 110 does not exist, the seventeenth calculated distance is calculated to be longer than an actual distance. The first RF chip 104, the second RF chip 105, the third RF chip 106, and the fourth RF chip 107 transmit the seventeenth to twentieth calculated distances as transmission data to the second reader/writer 103.

After receiving the seventeenth to twentieth calculated distances as reception data, the second reader/writer 103 compares the distance from the second reader/writer 103 to each of the first RF chip 104, the second RF chip 105, the third RF chip 106, and the fourth RF chip 107; and the seventeenth to twentieth calculated distances. Here, the second reader/writer 103 determines that the distances from the second reader/writer 103 to each of the second RF chip 105, the third RF chip 106, and the fourth RF chip 107 are equal to the eighteenth to twentieth calculated distances. On the other hand, the second reader/writer 103 determines that the seventeenth calculated distance is longer than the distance from the second reader/writer 103 to the first RF chip 104. That is, the second reader/writer 103 determines that the distance from the second reader/writer 103 to the first RF chip 104 is necessary to be corrected to be shorter than the calculated distance.

The above-described operation is the position correction operation of the position information detection system of the invention using the RF chip.

Next, position detection operation of a position information detection system of the invention using an RF chip is described.

Here, the first detection object in the first detection position 108 and the second detection object in the second detection position 109, to which the fifth RF chip and the sixth RF chip are attached respectively, are considered. Note that the fifth RF chip and the sixth RF chip each have a function to detect a signal intensity of a radio signal and calculate a distance from the detected signal intensity by using the relationship between the distance and the signal intensity shown in FIG. 7.

In FIG. 5, when the first reader/writer 102 transmits a radio signal, the fifth RF chip detects the forty-second signal intensity on the forty-second iso-signal intensity line 508 and calculates a twenty-first calculated distance 701 from FIG. 7. The sixth RF chip detects the forty-fourth signal intensity on the forty-fourth iso-signal intensity line 510 and calculates a twenty-second calculated distance 702 from FIG. 7. In FIG. 6, when the second reader/writer 103 transmits a radio signal, the fifth RF chip detects the sixty-third signal intensity on the sixty-third iso-signal intensity line 612 and calculates a twenty-third calculated distance 703 from FIG. 7. The sixth RF chip detects the fifty-fifth signal intensity on the fifty-fifth iso-signal intensity line 604 and calculates a twenty-fourth calculated distance 704 from FIG. 7.

Here, the twenty-first calculated distance 701 and the twenty-third calculated distance 703 calculated by the fifth RF chip are transmitted as transmission data to the first reader/writer 102 and the second reader/writer 103 respectively. The first reader/writer 102 and the second reader/writer 103 receive data of the twenty-first calculated distance 701 and the twenty-third calculated distance 703 and perform arithmetic processing by using the data, thereby to calculate a temporary position of the fifth RF chip. Note that the calculated temporary position of the fifth RF chip is a third detection position 111 in FIGS. 5 and 6.

In the previous position correction operation, the first reader/writer 102 and the second reader/writer 103 have determined that the distance from the first reader/writer 102 to the second RF chip 105 and the distance from the second reader/writer 103 to the first RF chip 104 are needed to be corrected to be shorter than the calculated distances. Therefore, the twenty-third calculated distance 703 is corrected to be shorter to be a twenty-fifth calculated distance. Later, the first reader/writer 102 and the second reader/writer 103 receive data of the twenty-first calculated distance 701 and the twenty-fifth calculated distance and perform arithmetic processing by using the data, thereby to calculate a third calculated position of the fifth RF chip.

The twenty-first calculated distance 701 is generally equal to the first distance 218, which is the distance from the first reader/writer 102 to the fifth RF chip. The twenty-fifth calculated distance is generally equal to the third distance 318, which is the distance from the second reader/writer 103 to the fifth RF chip. Therefore, the third calculated position of the fifth RF chip calculated from the twenty-first calculated distance 701 and the twenty-fifth calculated distance generally corresponds to the first detection position 108. Accordingly, a position of the first detection object to which the fifth RF chip is attached is calculated as the first detection position 108.

In addition, the twenty-second calculated distance 702 and the twenty-fourth calculated distance 704 calculated by the sixth RF chip are transmitted as transmission data to the first reader/writer 102 and the second reader/writer 103 respectively. The first reader/writer 102 and the second reader/writer 103 receive data of the twenty-second calculated distance 702 and the twenty-fourth calculated distance 704 and perform arithmetic processing by using the data, thereby to calculate an temporary position of the sixth RF chip. Note that the calculated temporary position of the sixth RF chip generally corresponds to the second detection position 109 in FIGS. 5 and 6.

In the previous position correction operation, the first reader/writer 102 and the second reader/writer 103 have determined that the distance from the first reader/writer 102 to the second RF chip 105 and the distance from the second reader/writer 103 to the first RF chip 104 are needed to be corrected to be shorter than the calculated distances. However, it is recognized that the calculated temporary position of the sixth RF chip is not a position to be corrected. Therefore, the calculated distance is not corrected, and the temporary position of the sixth RF chip is calculated as a fourth calculated position of the sixth RF chip.

The twenty-second calculated distance 702 is generally equal to the second distance 219, which is the distance from the first reader/writer 102 to the sixth RF chip. The twenty-fourth calculated distance 704 is generally equal to the fourth distance 319, which is a distance from the second reader/writer 103 to the sixth RF chip. Therefore, the fourth calculated position of the sixth RF chip calculated from the twenty-second calculated distance 702 and the twenty-fourth calculated distance 704 generally corresponds to the second detection position 109. Accordingly, a position of the second detection object to which the sixth RF chip is attached is calculated as the second detection position 109.

The above-described operation is the position detection operation of the position information detection system of the invention using the RF chip. By regular repetition of the position correction operation, position information detection precision can be improved even when a position and/or a shape of an obstruction is/are changed over time. The position detection operation can be easily employed even when not only an obstruction but also a reflective object exists. Further, the position detection operation with higher precision can be realized by provision of a plurality of reader/writers and RF chips of which installation positions are known.

As described above, position detection with high precision can be realized by the position information detection system of the invention using the RF chip.

Note that in this embodiment mode, the RF chip has a function to calculate a distance from a signal intensity; however, the reader/writer may have this function. In this case, the RF chip may have a function to detect a signal intensity and a function to transmit the detected signal intensity to the reader/writer as transmission data. When the reader/writer has a function to calculate a distance from a signal intensity, reductions in size and power consumption of the RF chip can be realized.

In addition, in this embodiment mode, the reader/writer has a function to calculate a position from a calculated distance; however, a server which is separately provided may have this function. When the server which is separately provided has a function to calculate a position from a calculated distance, reductions in size and power consumption of the reader/writer can be realized.

In addition, in this embodiment mode, the RF chip detests a radio signal transmitted from the reader/writer; however, it is easily possible to employ a structure where the reader/writer detects a radio signal transmitted from the RF chip. Note that when a source of a radio signal is the RF chip, the RF chip may be provided with a battery. When the RF chip is provided with the battery, communication range can be increased. Further, the battery may be capable of being charged (a secondary battery), since the battery is not needed to be replaced.

Figure 8C:
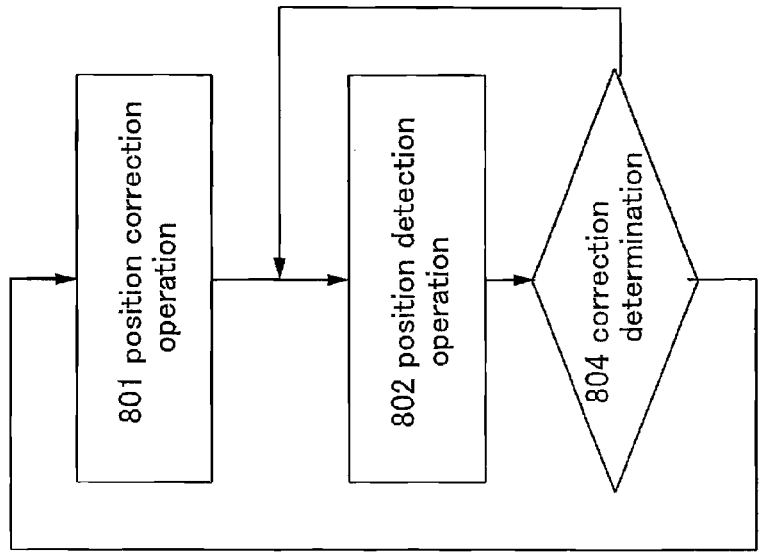
FIGS. 8A to 8C are flow charts of a position information detection system of the invention using an RF chip.
Figure 8B:
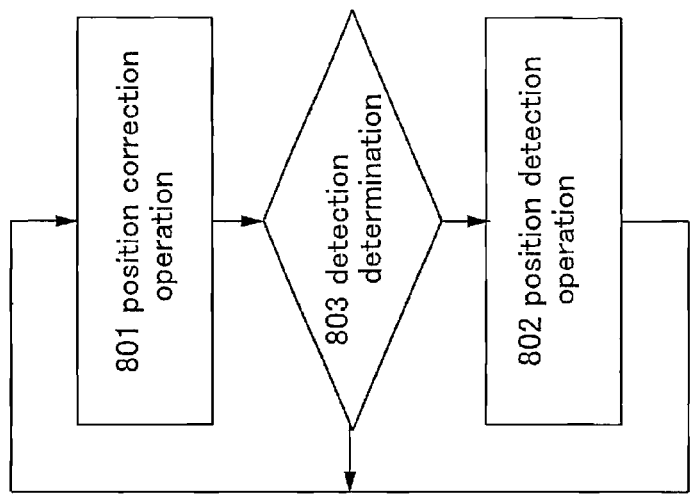
Figure 8A:
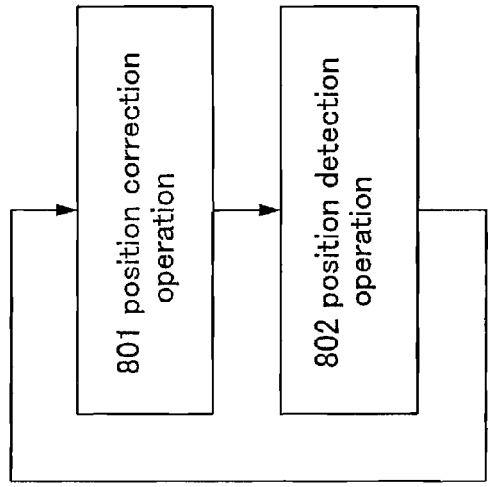
Figure 9B:
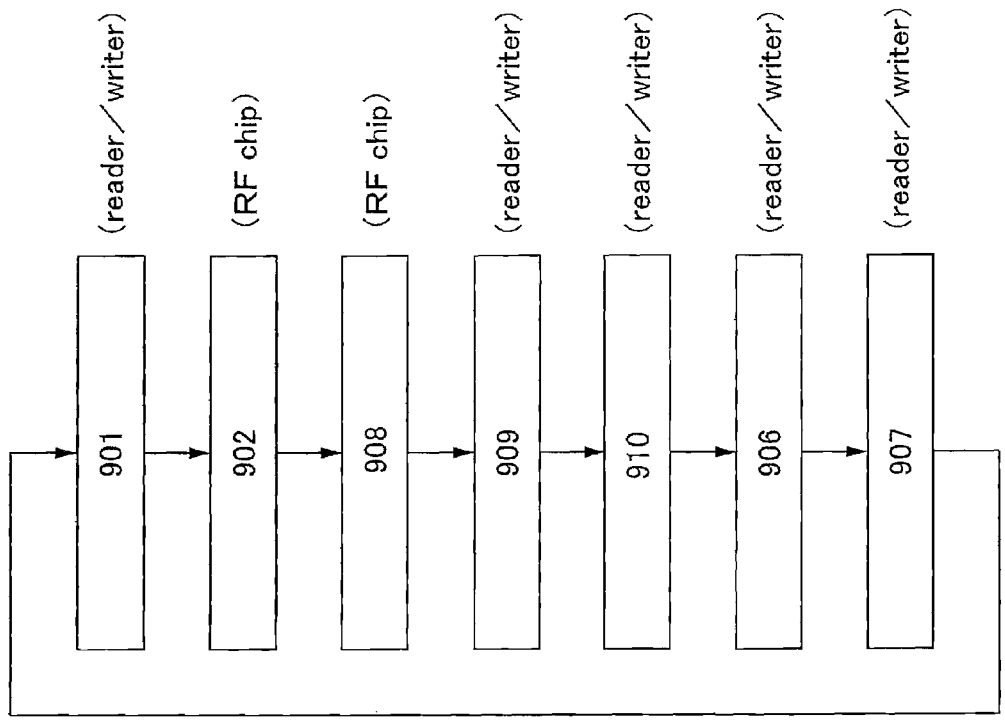
FIGS. 9A and 9B are flow charts of position correction operation of a position information detection system of the invention using an RF chip.
Figure 9A:
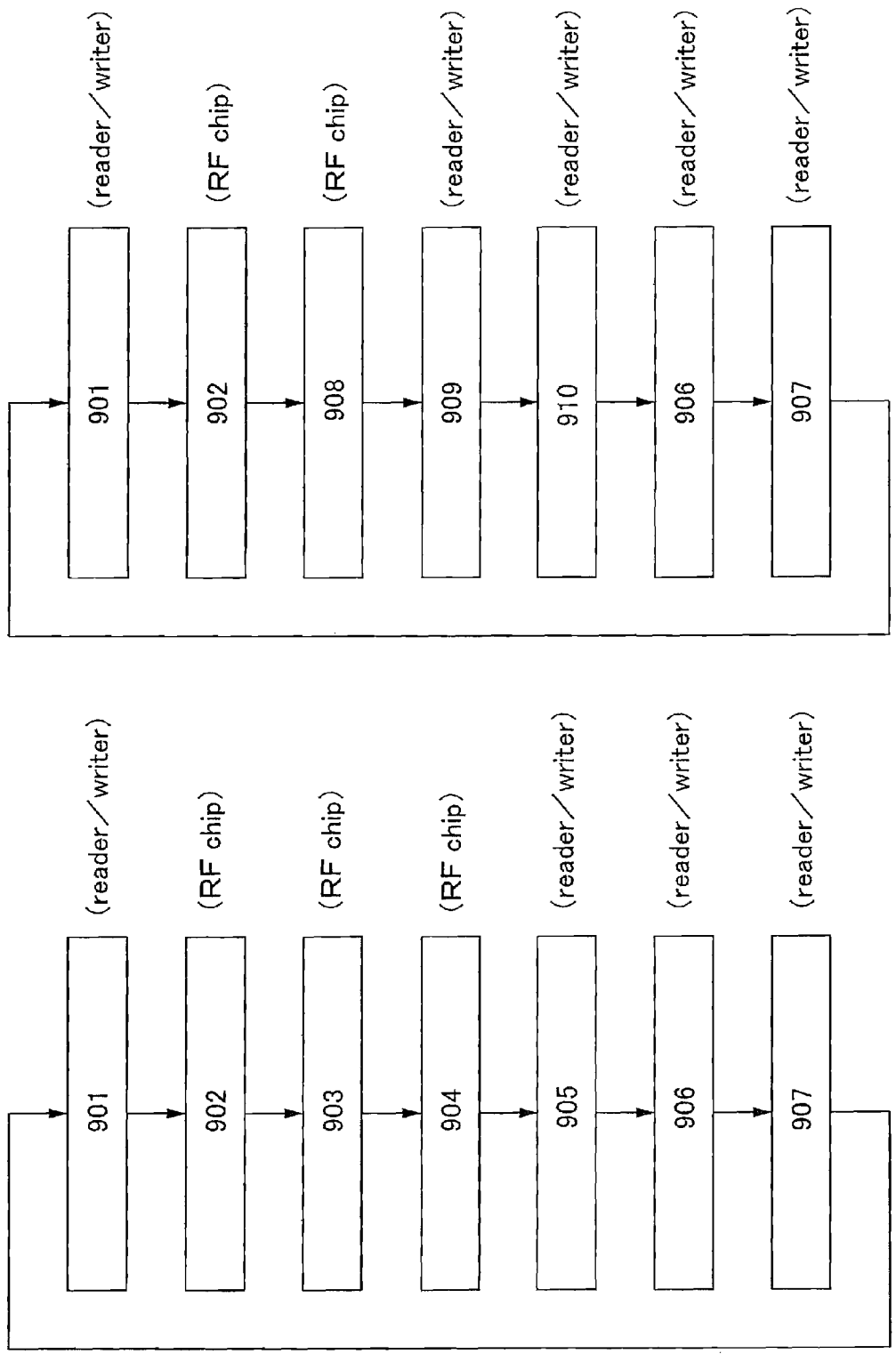

Next, flow charts of a position information detection system of the invention using an RF chip are described with reference to FIGS. 8A to 8C, 9A, 9B, 10A, and 10B. FIGS. 8A to 8C are flow charts of a position information detection system of the invention using an RF chip. FIGS. 9A and 9B are flow charts of position correction operation of a position information detection system of the invention using an RF chip. FIGS. 10A and 10B are flow charts of position detection operation of a position information detection system of the invention using an RF chip.

FIG. 8A is a first flow chart of the position information detection system. In this method, position correction operation 801 and position detection operation 802 are repeated. In this method, unnecessary position correction operation is not required since the position correction operation is performed only before the position detection operation. This method is effective when a position and/or a shape of an obstruction or a reflective object is/are frequently changed, since the position correction operation is always performed before the position detection operation.

FIG. 8B is a second flow chart of the position information detection system. In this method, detection determination 803 is performed after the position correction operation 801. In the detection determination 803, whether to proceed to the position detection operation 802 or to repeat the position correction operation 801 is determined. The detection determination 803 is performed by a reader/writer or a server managing the reader/writer. In this method, position correction precision can be improved by regularly correcting change of the position and/or the shape of the obstruction or the reflective object.

FIG. 8C is a third flow chart of the position information detection system. In this method, correction determination 804 is performed after the position detection operation 802. In the correction determination 804, whether to proceed to the position correction operation 801 or to repeat the position detection operation 802 is determined. The correction determination 804 is performed by the reader/writer or the server managing the reader/writer. This method is effective when position information detection of an object is frequently performed and when the position and/or the shape of the obstruction or the reflective object is/are not much changed.

FIG. 9A is a first flow chart of the position correction operation. The flow chart shows the case where the RF chip has a function to calculate a distance from a signal intensity and the reader/writer has a function to calculate a position from a calculated distance.

First, the reader/writer transmits a radio signal (radio signal transmission 901), and the RF chip receives the radio signal and detects a signal intensity (signal intensity detection 902). The RF chip calculates a calculated distance from the signal intensity (calculated distance calculation 903), and transmits the calculated distance to the reader/writer as transmission data (calculated distance transmission 904). The reader/writer receives the calculated distance (calculated distance reception 905), and compares a distance between the reader/writer and the RF chip, which is previously known, and the calculated distance (actual distance and calculated distance comparison 906). The reader/writer determines a correction method of a calculated distance in accordance with a comparison result (correction method determination 907).

Note that in this method, the reader/writer has a function to correct a calculated distance; however, a server which is separately provided may have this function. Further, in this method, the RF chip detects a radio signal transmitted from the reader/writer; however, it is easily possible that the reader/writer may detect a radio signal transmitted from the RF chip.

FIG. 9B is a second flow chart of the position correction operation. The flow chart shows the case where the reader/writer has a function to calculate a distance from a signal intensity and a function to calculate a position from a calculated distance.

First, the reader/writer transmits a radio signal (the radio signal transmission 901), and the RF chip receives the radio signal and detects a signal intensity (the signal intensity detection 902). The RF chip transmits the signal intensity to the reader/writer as transmission data (signal intensity transmission 908). The reader/writer receives the signal intensity (signal intensity reception 909), and calculates a calculated distance from the signal intensity (calculated distance calculation 910). The reader/writer compares a distance between the reader/writer and the RF chip, which is previously known, and the calculated distance (the actual distance and calculated distance comparison 906). The reader/writer determines a correction method of a calculated distance in accordance with a comparison result (the correction method determination 907).

Note that in this method, the reader/writer has a function to correct a calculated distance; however, a server which is separately provided may have this function. Further, in this method, the RF chip detects a radio signal transmitted from the reader/writer; however, it is easily possible that the reader/writer may detect a radio signal transmitted from the RF chip. When the server which is separately provided has a function to correct a calculated distance, reductions in size and power consumption of the reader/writer can be realized.

FIG. 10A is a first flow chart of the position detection operation. The flow chart shows the case where the RF chip has a function to calculate a distance from a signal intensity and the reader/writer has a function to calculate a position from a calculated distance.

First, the reader/writer transmits a radio signal (radio signal transmission 1001), and the RF chip receives the radio signal and detects a signal intensity (signal intensity detection 1002). The RF chip calculates a calculated distance from the signal intensity (calculated distance calculation 1003), and transmits the calculated distance to the reader/writer as transmission data (calculated distance transmission 1004). The reader/writer receives the calculated distance (calculated distance reception 1005), and corrects the calculated distance in accordance with a correction method determined by the position correction operation (calculated distance correction 1006). The reader/writer calculates a position of an object from the corrected calculated distance (position calculation 1007).

Note that in this method, the reader/writer has a function to correct a calculated distance and a function to calculate a position; however, a server which is separately provided may have these functions. When the server which is separately provided has a function to correct a calculated distance and a function to calculate a position, reductions in size and power consumption of the reader/writer can be realized.

In addition, in this method, the RF chip detsts a radio signal transmitted from the reader/writer; however, it is easily possible to employ a structure where the reader/writer detects a radio signal transmitted from the RF chip. When the RF chip is a source of a radio signal and the reader/writer detects the radio signal, the RF chip may be provided with a battery. When the RF chip is provided with the battery, communication range can be increased. Further, the battery may be capable of being charged (a secondary battery), since the battery is not needed to be replaced.

FIG. 10B is a second flow chart of the position detection operation. The flow chart shows the case where the reader/writer has a function to calculate a distance from a signal intensity and a function to calculate a position from a calculated distance.

First, the reader/writer transmits a radio signal (the radio signal transmission 1001), and the RF chip receives the radio signal and detects a signal intensity (the signal intensity detection 1002). The RF chip transmits the signal intensity to the reader/writer as transmission data (signal intensity transmission 1008). The reader/writer receives the signal intensity (signal intensity reception 1009), and calculates a calculated distance from the signal intensity (calculated distance calculation 1010). The reader/writer corrects the calculated distance in accordance with the correction method determined by the position correction operation (the calculated distance correction 1006). The reader/writer calculates the position of the object from the corrected calculated distance (the position calculation 1007).

Note that in this method, the reader/writer has a function to correct a calculated distance and a function to calculate a position; however, a server which is separately provided may have these functions. When the server which is separately provided has a function to correct a calculated distance and a function to calculate a position, reductions in size and power consumption of the reader/writer can be realized.

In addition, in this method, the RF chip detests a radio signal transmitted from the reader/writer; however, it is easily possible to employ a structure where the reader/writer detects a radio signal transmitted from the RF chip. When the RF chip is a source of a radio signal and the reader/writer detects the radio signal, the RF chip may be provided with a battery. When the RF chip is provided with the battery, communication range can be increased. Further, the battery may be capable of being charged (a secondary battery), since the battery is not needed to be replaced.

With the structure described above, a position information detection system using an RF chip can be provided, of which position detection precision can be improved even in an environment in which an obstruction and a reflective object exist.

Embodiment 1

Figure 22:
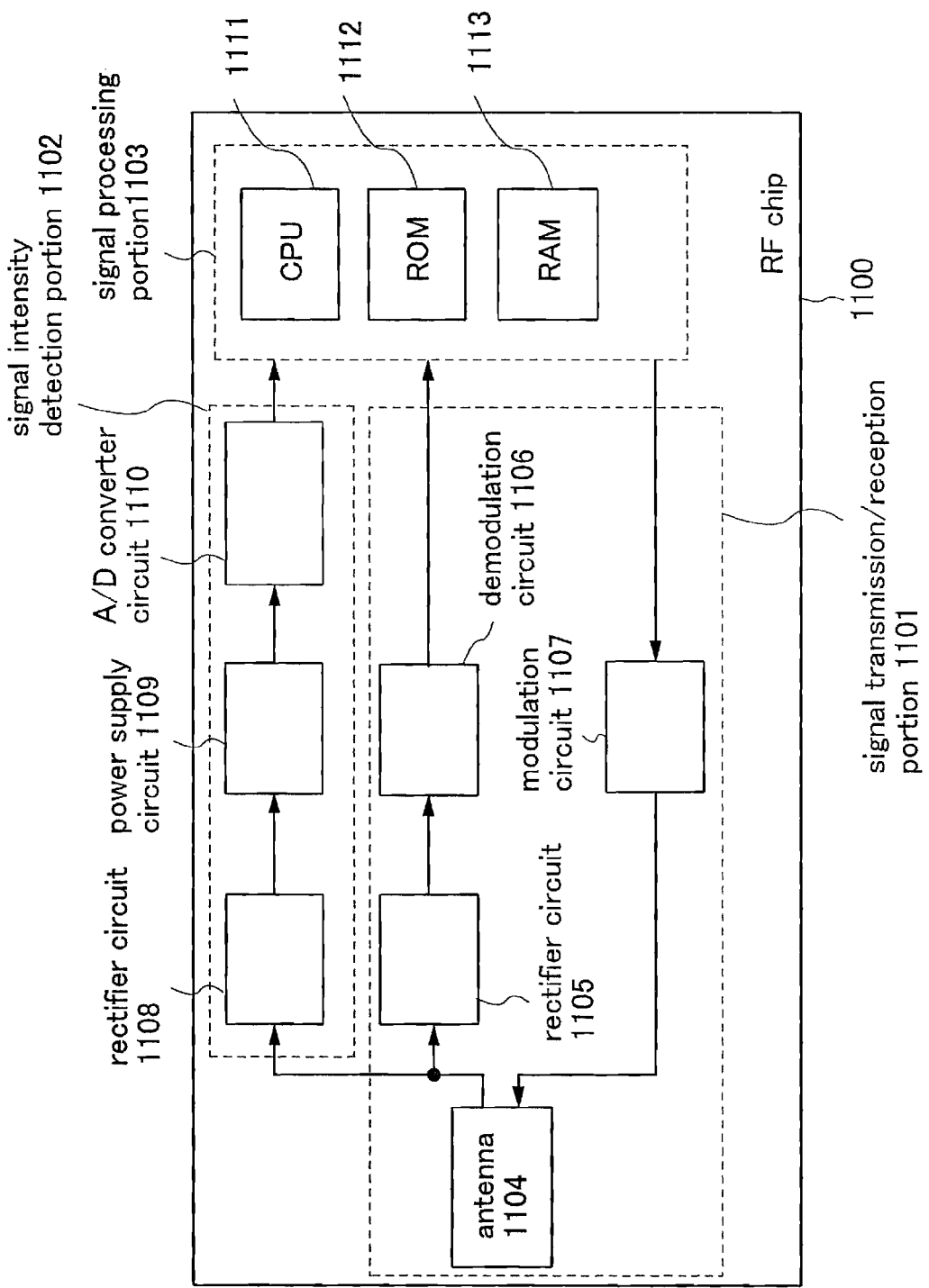
FIG. 22 is a diagram showing a structure of Embodiment 1 using the invention.

In this embodiment, a structure of a semiconductor device (hereinafter referred to as an RF chip) which is combined with an antenna for wireless communication shown in the embodiment mode is described. FIG. 22 is a block diagram of an RF chip. The RF chip transmits and receives data by transmission and reception of a radio signal (operating magnetic field) with use of a wireless communication device (hereinafter referred to as a reader/writer).

An RF chip 1100 in FIG. 22 mainly includes a signal transmission/reception portion 1101, a signal intensity detection portion 1102, and a signal processing portion 1103. The signal transmission/reception portion 1101 includes an antenna 1104, a rectifier circuit 1105, a demodulation circuit 1106, and a modulation circuit 1107. The signal intensity detection portion 1102 includes a rectifier circuit 1108, a power supply circuit 1109, and an A/D converter circuit 1110. The signal processing portion 1103 includes a Central Processing Unit (CPU) 1111, a Read Only Memory (ROM) 1112, and a Random Access Memory (RAM) 1113. It is acceptable as long as the signal processing portion 1103 includes a logic circuit such as the CPU 1111; the RAM 1113, which is a volatile memory (typically SRAM), as a work region for the CPU 1111; and the ROM 1112, which is a writable nonvolatile memory (typically EEPROM), for storing a program of the CPU 1111.

The signal intensity detection portion 1102 in the RF chip has a function to detect an intensity of a signal received by the RF chip. The signal processing portion has a function to calculate a distance between the reader/writer and the RF chip from the intensity of the signal received by the RF chip. The signal transmission/reception portion has a function to input the signal received by the RF chip to the signal processing portion and read information on individual identification of the RF chip from a storage element such as the ROM and the RAM of the signal processing portion to transmit to the reader/writer; and a function to transmit to the reader/writer information on the distance between the reader/writer and the RF chip calculated by the signal processing portion.

In FIG. 22, in the signal transmission/reception portion 1101, a signal received by the antenna 1104 is inputted to the rectifier circuit 1105. An output signal from the rectifier circuit 1105 is inputted to the demodulation circuit 1106. An output signal from the demodulation circuit 1106 is inputted to the signal processing portion 1103, and information on individual identification of the RF chip is outputted to the modulation circuit 1107. An output signal from the modulation circuit 1107 is outputted to the antenna and outputted to the reader/writer outside the RF chip.

In FIG. 22, in the signal intensity detection portion 1102, a signal received by the antenna 1104 in the signal transmission/reception portion 1101 is inputted to the rectifier circuit 1108. An output signal from the rectifier circuit 1108 is inputted to the power supply circuit 1109. Although an output from the power supply circuit 1109 is also supplied to each circuit of the RF chip as power, the output from the power supply circuit 1109 here is inputted to the A/D converter circuit 1110. The A/D converter circuit 1110 converts an analog signal outputted from the power supply circuit 1109 into a digital signal and output the digital signal to the signal portion 1103.

In FIG. 22, in the signal processing portion 1103, the distance between the reader/writer and the RF chip is calculated in accordance with the digital signal outputted from the A/D converter circuit 1110 in the signal intensity detection portion 1102. In the signal processing portion, calculation of the distance between the reader/writer and the RF chip is preferably processed using software. In a processing method using software, an arithmetic circuit is formed using the CPU 1111, the ROM 1112, and the RAM 1113, and a distance calculation program is executed by the CPU. It is preferable to process using software since modification of a distance calculation method can be achieved by program modification and further, an occupation area of hardware in the RF chip can be reduced. It is needless to say that a distance may be calculated using hardware or using software and hardware in combination. Note that data on the calculated distance is outputted to the reader/writer through the modulation circuit 1107 and the antenna 1104 in the signal transmission/reception portion 1101.

Since the RF chip can have the structure described above, a semiconductor device in the position information detection system of the invention, which calculates a distance between the reader/writer and the RF chip, can be obtained.

Embodiment 2

In this embodiment, a manufacturing method of the RF chip shown in the aforementioned embodiment is described. Each circuit included in the RF chip according to the invention can be formed using a thin film transistor. In this embodiment, a method of forming a flexible RF chip is described, by which a circuit included in the RF chip is formed using a thin film transistor and the circuit is transferred from a substrate used for forming the thin film transistor to a flexible substrate.

In this embodiment, as a circuit included in the RF chip, a p-channel transistor (also referred to as a pch-TFT) and an n-channel transistor (also referred to as an nch-TFT) included in an inverter or the like, and an antenna over a thin film transistor are typically shown. Hereinafter, a manufacturing method of the RF chip is described with reference to cross-sectional views shown in FIGS. 11A to 11D, 12A to 12C, and 13A and 13B.

First, a peeling layer 1303 is formed on one surface of a substrate 1301 with an insulating film 1302 therebetween, and then, an insulating film 1304 functioning as a base film and a semiconductor film 1305 (e.g., a film containing amorphous silicon) are stacked (see FIG. 11A). Note that the insulating film 1302, the peeling layer 1303, the insulating film 1304, and the semiconductor film 1305 can be continuously formed.

As the substrate 1301, a glass substrate, a quartz substrate, a metal substrate (e.g., a stainless steel substrate), a ceramic substrate, a semiconductor substrate such as a Si substrate, and the like is used. In addition, a plastic substrate such as a substrate formed using polyethylene terephthalate (PET), polyethylene naphthalate (PEN), polyether sulfone (PES), acrylic, or the like can be used. Note that in this step, the peeling layer 1303 is formed on an entire surface of the substrate 1301 with the insulating film 1302 therebetween; however, the peeling layer may be selectively formed by a photolithography method after the peeling layer is provided on the entire surface of the substrate 1301 if required.

Each of the insulating films 1302 and 1304 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when the insulating films 1302 and 1304 each have a two-layer structure, it is preferable that a silicon nitride oxide film be formed as a first insulating film and a silicon oxynitride film be formed as a second insulating film. Alternatively, a silicon nitride film may be formed as the first insulating film and a silicon oxide film may be formed as the second insulating film. The insulating film 1302 functions as a blocking layer which prevents an impurity element from being mixed into the peeling layer 1303 or an element formed thereover from the substrate 1301. The insulating film 1304 functions as a blocking layer which prevents an impurity element from being mixed into an element formed over the peeling layer 1303 from the substrate 1301 or the peeling layer 1303. By forming the insulating films 1302 and 1304 functioning as the blocking layer in this manner, the element formed thereover can be prevented from being adversely affected by alkali metal such as Na and alkali earth metal from the substrate 1301 and the impurity element included in the peeling layer 1303. Note that when quartz is used for the substrate 1301, the insulating films 1302 and 1304 may be omitted.

As the peeling layer 1303, a metal film, a stacked-layer structure of a metal film and a metal oxide film, or the like can be used. As the metal film, a single-layer structure or a stacked-layer structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing the above-described element as its main component is employed. These materials can be formed using a sputtering method, various CVD methods such as a plasma CVD method, or the like. As the stacked-layer structure of a metal film and a metal oxide film, after the aforementioned metal film is formed, plasma treatment in an oxygen atmosphere or an $N_2O$ atmosphere, or heat treatment in an oxygen atmosphere or an $N_2O$ atmosphere is performed so that an oxide or an oxynitride of the metal film can be formed on a surface of the metal film. For example, when a tungsten film is formed as the metal film by a sputtering method, a CVD method, or the like, plasma treatment is performed on the tungsten film so that a metal oxide film of tungsten oxide can be formed on a surface of the tungsten film. Alternatively, for example, after a metal film (e.g., tungsten) is formed, an insulating film of silicon oxide ($SiO_2$) or the like may be formed over the metal film by a sputtering method, and a metal oxide can be formed over the metal film (e.g., tungsten oxide over tungsten). As plasma treatment, high-density plasma treatment may be performed, for example. Further, a metal nitride or a metal oxynitride may also be used in addition to the metal oxide film. In this case, plasma treatment or heat treatment may be performed on the metal film in a nitrogen atmosphere or an atmosphere of nitrogen and oxygen.

The amorphous semiconductor film 1305 is formed having a thickness of 25 to 200 nm (preferably, 30 to 150 nm) by a sputtering method, an LPCVD method, a plasma CVD method, or the like.

Next, the amorphous semiconductor film 1305 is crystallized by being irradiated with laser light. Alternatively, the amorphous semiconductor film 1305 may be crystallized by a method in which laser light irradiation is combined with a thermal crystallization method using an RTA or an annealing furnace, or a thermal crystallization method using a metal element for promoting crystallization, or the like. Thereafter, the obtained crystalline semiconductor film is etched into a desired shape to form crystalline semiconductor films 1305*a* to 1305*f*. Then, a gate insulating film 1306 is formed to cover the semiconductor films 1305*a* to 1305*f* (see FIG. 11B).

The gate insulating film 1306 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. For example, when the gate insulating film 1306 has a two-layer structure, it is preferable that a silicon oxynitride film be formed as a first insulating film and a silicon nitride oxide film be formed as a second insulating film. Alternatively, a silicon oxide film may be formed as the first insulating film and a silicon nitride film may be formed as the second insulating film.

An example of a manufacturing step of the crystalline semiconductor films 1305*a* to 1305*f* is briefly described below. First, an amorphous semiconductor film having a thickness of 50 to 60 nm is formed by a plasma CVD method. Next, a solution containing nickel, which is a metal element for promoting crystallization, is retained on the amorphous semiconductor film, and dehydrogenation treatment (at 500° C., for one hour) and thermal crystallization treatment (at 550° C., for four hours) are performed on the amorphous semiconductor film to form the crystalline semiconductor film. Thereafter, the crystalline semiconductor films 1305*a* to 1305*f* are formed by laser light irradiation and a photolithography method. Note that the amorphous semiconductor film may be crystallized only by laser light irradiation, without performing the thermal crystallization which uses the metal element for promoting crystallization.

As a laser beam used for crystallization, a continuous wave laser beam (a CW laser beam) or a pulsed laser beam (a pulse laser beam) can be used. As a laser beam which can be used here, a laser emitted from one or more of the following can be used: a gas laser such as an Ar laser, a Kr laser, or an excimer laser; a laser of which a medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; or a gold vapor laser. Crystals with a large grain size can be obtained by irradiation with a fundamental wave of such a laser beam or second to fourth harmonics of the fundamental wave. For example, the second harmonic (532 nm) or the third harmonic (355 nm) of an Nd:$YVO_4$ laser (fundamental wave of 1064 nm) can be used. In this case, a power density of the laser is needed to be approximately 0.01 to 100 MW/cm$^2$ (preferably, 0.1 to 10 MW/cm$^2$). Irradiation is performed with a scanning rate of approximately 10 to 2000 cm/sec. Note that a laser of which a medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated, and pulse oscillation thereof can be performed at a repetition rate of 10 MHz or more by performing Q-switch operation, mode locking, or the like. When a laser beam is oscillated at a repetition rate of 10 MHz or more, a semiconductor film is irradiated with the next pulse while the semiconductor film is melted by the laser and solidified. Accordingly, unlike the case of using a pulsed laser with a low repetition rate, a solid-liquid interface can be continuously moved in the semiconductor film; thus, crystal grains which continuously grow in a scanning direction can be obtained.

The gate insulating film 1306 may be formed by performing the aforementioned high-density plasma treatment on the semiconductor films 1305a to 1305f to oxidize or nitride surfaces thereof. For example, plasma treatment is employed, in which a mixed gas of an inert gas such as He, Ar, Kr, or Xe, and oxygen, nitrogen oxide ($NO_2$), ammonia, nitrogen, hydrogen, or the like is introduced. When excitation of the plasma in this case is performed by introduction of a microwave, high-density plasma with a low electron temperature can be generated. By an oxygen radical (an OH radical is included in some cases) or a nitrogen radical (an NH radical is included in some cases) generated by the high-density plasma, the surface of the semiconductor film can be oxidized or nitrided.

By treatment using such high-density plasma, an insulating film having a thickness of 1 to 20 nm, typically 5 to 10 nm, is formed on the semiconductor film. Since the reaction of this case is a solid-phase reaction, interface state density between the insulating film and the semiconductor film can be extremely low. Since such high-density plasma treatment oxidizes (or nitrides) a semiconductor film (of crystalline silicon or polycrystalline silicon) directly, variation in thickness of an insulating film to be formed can be made extremely small, ideally. In addition, since oxidation is not strongly performed even in a crystal grain boundary of crystalline silicon, a very preferable condition is obtained. That is, by a solid-phase oxidation of the surface of the semiconductor film by the high-density plasma treatment shown here, the insulating film with good uniformity and low interface state density can be formed without causing excessive oxidation reaction in the crystal grain boundary.

As the gate insulating film, only an insulating film formed by high-density plasma treatment may be used, or an insulating film of silicon oxide, silicon oxynitride, silicon nitride, or the like may be formed thereover to be stacked by a CVD method utilizing plasma or thermal reaction. In any case, a transistor which includes an insulating film formed by high-density plasma as a part of or the whole gate insulating film can reduce variation in characteristics.

In addition, the semiconductor films 1305a to 1305f which are obtained in such a manner that the semiconductor film is irradiated with a continuous wave laser or a laser beam oscillated at a repetition rate of 10 MHz or more and is scanned in one direction for crystallization, have characteristics that the crystal grows in the scanning direction of the laser beam. A transistor is provided so that the scanning direction is aligned with the channel length direction (a direction in which carriers flow when a channel formation region is formed) and the aforementioned gate insulating film is used; thus, a thin film transistor (with less characteristic variation and high electron field-effect mobility can be obtained.

Next, a first conductive film and a second conductive film are stacked over the gate insulating film 1306. Here, the first conductive film is formed having a thickness of 20 to 100 nm by a CVD method, a sputtering method, or the like; and the second conductive film is formed having a thickness of 100 to 400 nm. The first conductive film and the second conductive film are each formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, they may be formed using a semiconductor material typified by polycrystalline silicon doped with an impurity element such as phosphorus. As an example of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in the case of a three-layer structure instead of a two-layer structure, a stacked-layer structure of a molybdenum film, an aluminum film, and a molybdenum film is preferably adopted.

Next, a resist mask is formed by a photolithography method, and etching treatment for forming a gate electrode and a gate line is performed to form a gate electrode 1307 above the semiconductor films 1305a to 1305f. Here, as the gate electrode 1307, an example is shown in which a stacked-layer structure of a first conductive film 1307a and a second conductive film 1307b is provided.

Next, with use of the gate electrode 1307 as a mask, an impurity element imparting n-type conductivity is added to the semiconductor films 1305a to 1305f at a low concentration by an ion doping method or an ion implantation method, and thereafter, a resist mask is selectively formed by a photolithography method and an impurity element imparting p-type conductivity is added at a high concentration. As the impurity element imparting n-type conductivity, phosphorus (P), arsenic (As), or the like can be used. As the p-type impurity element, boron (B), aluminum (Al), gallium (Ga), or the like can be used. Here, phosphorus (P) is used as the impurity element imparting n-type conductivity and selectively introduced into the semiconductor films 1305a to 1305f to be contained at a concentration of $1\times10^{15}$ to $1\times10^{19}/cm^3$, and an n-type impurity region 1308 is formed. Further, boron (B) is used for the impurity element imparting p-type conductivity and selectively introduced into the semiconductor films 1305c and 1305e to be contained at a concentration of $1\times10^{19}$ to $1\times10^{20}/cm^3$, and a p-type impurity region 1309 is formed (see FIG. 11C).

Then, an insulating film is formed to cover the gate insulating film 1306 and the gate electrode 1307. The insulating film is formed to have a single-layer structure or a stacked-layer structure using a film including an inorganic material such as silicon, oxide of silicon, or nitride of silicon, or a film including an organic material such as an organic resin by a plasma CVD method, a sputtering method, or the like. Next, the insulating film is selectively etched by anisotropic etching mainly in a perpendicular direction, so that insulating films 1310 (also referred to as sidewalls) which are in contact with side surfaces of the gate electrode 1307 are formed. The insulating films 1310 are used as masks for doping to form an LDD (Lightly Doped Drain) region.

Then, with use of the resist mask formed by a photolithography method, the gate electrode 1307, and the insulating films 1310 as masks, an impurity element imparting n-type conductivity is added to the semiconductor films 1305a, 1305b, 1305d, and 1305f at a high concentration, and an n-type impurity region 1311 is formed. Here, phosphorus (P) is used as the impurity element imparting n-type conductivity and selectively introduced into the semiconductor films 1305a, 1305b, 1305d, and 1305f to be contained at a concentration of $1\times10^{19}$ to $1\times10^{20}/cm^3$, and the impurity region 1311 having n-type conductivity at a higher concentration than the impurity region 1308 is formed.

Through the above-described steps, n-channel thin film transistors 1300a, 1300b, 1300d, and 1300f and p-channel thin film transistors 1300c and 1300e are formed (see FIG. 11D).

In the n-channel thin film transistor 1300a, a channel formation region is formed in a region of the semiconductor film 1305a, which overlaps with the gate electrode 1307; the impurity region 1311 functioning as a source region or a drain region is formed in a region of the semiconductor film 1305a, which does not overlap with the gate electrode 1307; and a low concentration impurity region (LDD region) is formed in a region of the semiconductor film 1305a, which overlaps with the insulating film 1310, and between the channel formation region and the impurity region 1311. Similarly, in the n-channel thin film transistors 1300b, 1300d, and 1300f, a channel formation region, a low concentration impurity region, and the impurity region 1311 are formed.

In the p-channel thin film transistor 1300c, a channel formation region is formed in a region of the semiconductor film 1305c, which overlaps with the gate electrode 1307; and the impurity region 1309 forming a source region or a drain region is formed in a region of the semiconductor film 1305c, which does not overlap with the gate electrode 1307. Similarly, in the p-channel thin film transistor 1300e, a channel formation region and the impurity region 1309 are formed. Note that here the p-channel thin film transistors 1300c and 1300e are not provided with an LDD region; however, the p-channel thin film transistor may be provided with an LDD region or the n-channel thin film transistor is not provided with an LDD region.

Next, an insulating film is formed to have a single-layer structure or a stacked-layer structure to cover the semiconductor films 1305a to 1305f, the gate electrode 1307, and the like. Then, conductive films 1313 which are electrically connected to the impurity regions 1309 and 1311 each forming the source region or the drain region of the thin film transistors 1300a to 1300f are formed over the insulating film (see FIG. 12A). The insulating film is formed to have a single-layer structure or a stacked-layer structure using an inorganic material such as oxide of silicon or nitride of silicon; an organic material such as polyimide, polyamide, benzocyclobutene, acrylic, or epoxy; a siloxane material; or the like, by a CVD method, a sputtering method, an SOG method, a droplet discharging method, a screen printing method, or the like. Here, the insulating film has a two-layer structure; and a nitride oxide silicon film is formed as a first insulating film 1312a, and an oxynitride film is formed as a second insulating film 1312b. The conductive films 1313 can form source electrodes or drain electrodes of the thin film transistors 1300a to 1300f.

Before the insulating films 1312a and 1312b are formed or after one or a plurality of layers of the insulating films 1312a and 1312b are formed, heat treatment for recovering the crystallinity of the semiconductor film, for activating the impurity element added to the semiconductor film, or for hydrogenating the semiconductor film is preferably performed. For the heat treatment, thermal annealing, a laser annealing method, an RTA method, or the like is preferably employed.

The conductive films 1313 are formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to, for example, a material which contains aluminum as its main component and also contains nickel; or an alloy material which contains aluminum as its main component and also contains nickel and one or both of carbon and silicon. The conductive films 1313 preferably employ, for example, a stacked-layer structure of a barrier film, an aluminum-silicon (Al—Si) film, and a barrier film; or a stacked-layer structure of a bather film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the conductive films 1313. In addition, provision of upper and lower barrier layers can prevent generation of hillocks of aluminum or aluminum silicon. Further, when a barrier film is formed of titanium which is a highly-reducible element, even if a thin natural oxide film is formed on the crystalline semiconductor film, the natural oxide film is reduced so that preferable contact with the crystalline semiconductor film can be obtained.

Next, an insulating film 1314 is formed to cover the conductive films 1313, and conductive films 1315a and 1315b which are electrically connected to the conductive films 1313 forming the source electrode or the drain electrode of the thin film transistors 1300a and 1300f are formed over the insulating film 1314. Further, conductive films 1316 which are electrically connected to the conductive films 1313 forming the source electrode or the drain electrode of the thin film transistors 1300b and 1300e are formed. Note that the conductive films 1315a and 1315b and the conductive films 1316 may be formed using the same material at the same time. The conductive films 1315a and 1315b and the conductive films 1316 can be formed using any material of the conductive film 1313.

Then, a conductive film 1317 functioning as an antenna is formed to be electrically connected to the conductive film 1316 (see FIG. 12B).

The insulating film 1314 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (O). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

The conductive film 1317 is formed using a conductive material by a CVD method, a sputtering method, a printing method such as screen printing or gravure printing, a droplet discharging method, a dispenser method, a plating method, or the like. The conductive material is formed to have a single-layer structure or a stacked-layer structure using an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing the above-described element as its main component.

For example, when the conductive film 1317 functioning as the antenna is formed by a screen printing method, it can be formed by selectively printing conductive paste in which conductive particles each having a grain size of several nm to several tens of μm are dissolved or dispersed in an organic resin. As the conductive particle, one or more metal particles of silver (Ag), gold (Au), copper (Cu), nickel (Ni), platinum (Pt), palladium (Pd), tantalum (Ta), molybdenum (Mo), titanium (Ti), and the like; a fine particle of silver halide; or a dispersive nanoparticle can be used. As the organic resin contained in the conductive paste, one or a plurality of organic resins functioning as a binder, a solvent, a dispersant, or a coating for the metal particle can be used. Typically, an organic resin such as an epoxy resin or a silicone resin can be given as an example. When the conductive film is formed, baking is preferably performed after the conductive paste is applied. For example, when fine particles (e.g., of which grain size is in the range of 1 to 100 nm, inclusive) containing silver as its main component are used as a material of the conductive paste, the conductive film can be obtained by hardening the conductive paste by baking at a temperature of 150 to 300° C. Alternatively, fine particles containing solder or lead-free solder as its main component may be used. In this case, it is preferable to use a fine particle having a grain size of 20 μm or less. Solder and lead-free solder have advantages such as low cost.

The conductive films 1315a and 1315b can function as wirings electrically connected to a battery included in a semiconductor device of the invention in a subsequent step. Further, when the conductive film 1317 functioning as the antenna is formed, another conductive film may be formed to be electrically connected to the conductive films 1315a and 1315b, and used as the wiring connected to the battery.

Next, after an insulating film 1318 is formed to cover the conductive film 1317, a layer (hereinafter referred to as an element formation layer 1319) including the thin film transistors 1300a to 1300f, the conductive film 1317, and the like is peeled from the substrate 1301. Here, after an opening is formed by laser light (e.g., UV light) irradiation in a region where the thin film transistors 1300a to 1300f are not formed (see FIG. 12C), the element formation layer 1319 can be peeled from the substrate 1301 with physical force. Alternatively, before the element formation layer 1319 is peeled from the substrate 1301, an etchant may be introduced into the opening so that the peeling layer 1303 is selectively removed. As the etchant, gas or liquid containing halogen fluoride or an interhalogen compound is used; for example, chlorine trifluoride (ClF$_3$) is used as a gas containing halogen fluoride. Thus, the element formation layer 1319 is peeled from the substrate 1301. Note that the peeling layer 1303 may be partially left instead of being removed entirely; thus, consumption of the etchant can be suppressed and processing time to remove the peeling layer can be shortened. Further, the element formation layer 1319 can be retained over the substrate 1301 even after the peeling layer 1303 is removed. In addition, cost can be reduced by reusing the substrate 1301 from which the element formation layer 1319 has been peeled off.

The insulating film 1318 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like.

Figure 13A:
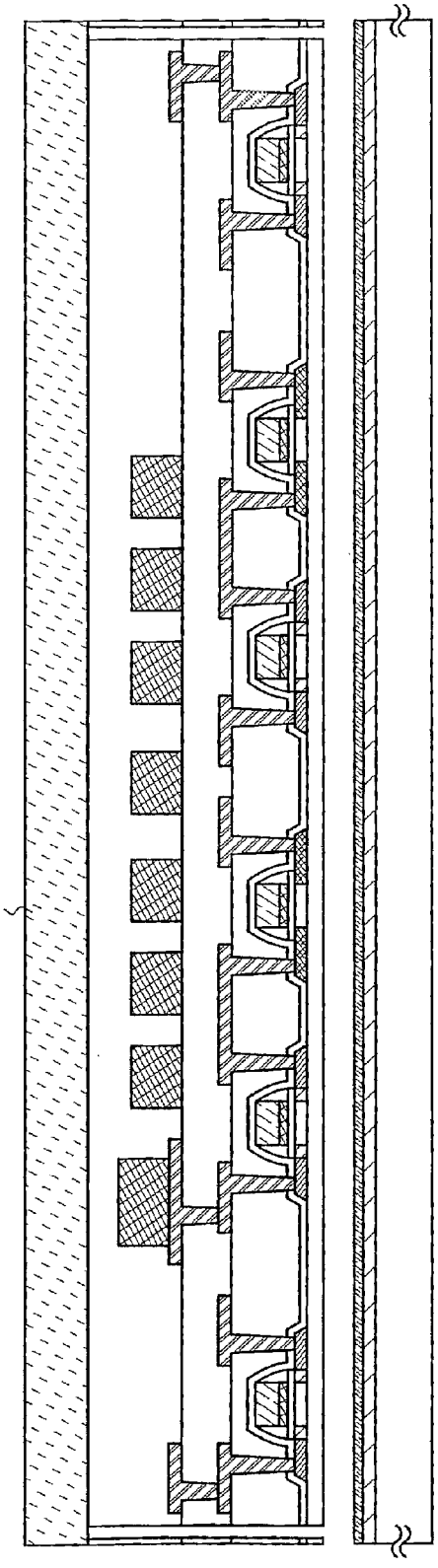
FIGS. 13A and 13B are diagrams showing a structure of Embodiment 2 using the invention.

In this embodiment, after the opening is formed in the element formation layer 1319 by laser light irradiation, a first sealing material 1320 is attached to one surface (a surface where the insulating film 1318 is exposed) of the element formation layer 1319, and then, the element formation layer 1319 is peeled from the substrate 1301 (see FIG. 13A).

Figure 13B:
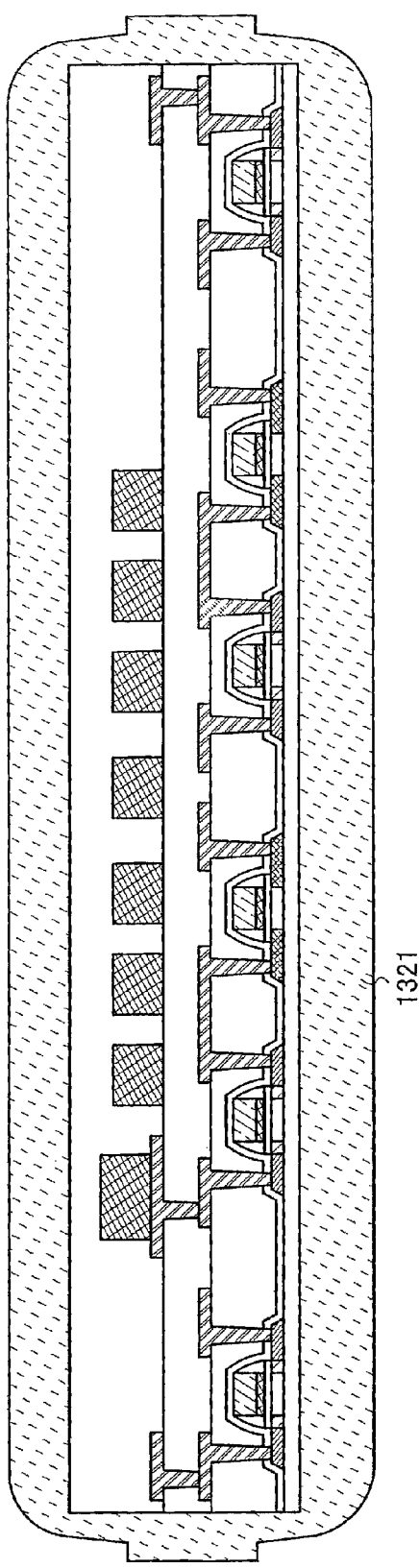

Next, a second sealing material 1321 is attached to the other surface (a surface exposed by peeling) of the element formation layer 1319 by one or both of heat treatment and pressure treatment (see FIG. 13B). As the first sealing material 1320 and the second sealing material 1321, a hot-melt film or the like can be used.

Alternatively, as the first sealing material 1320 and the second sealing material 1321, a film on which antistatic treatment for preventing static electricity or the like is performed (hereinafter referred to as an antistatic film) can also be used. As the antistatic film, a film with an antistatic material dispersed in a resin, a film with an antistatic material attached thereon, and the like can be given as an example. The film provided with the antistatic material may be a film provided with the antistatic material on one of its surfaces, or a film provided with the antistatic material on each of its surfaces. Further, as the film provided with the antistatic material on one of its surfaces, the film may be attached to the layer so that the antistatic material is placed on either the inner side of the film or the outer side of the film. The antistatic material may be provided over the entire or a part of the surface of the film. As the antistatic material here, a metal, indium tin oxide (ITO), or surfactant such as an amphoteric surfactant, a cationic surfactant, or a nonionic surfactant can be used. Alternatively, as the antistatic material, a resin material containing crosslinkable copolymer having a carboxyl group and a quaternary ammonium base in its side chain, or the like can be used. By attaching, mixing, or applying such a material to a film, the antistatic film can be formed. By sealing with the antistatic film, adverse effects on a semiconductor element due to static electricity or the like from the outside can be suppressed when the semiconductor device is treated as a commercial product.

Note that this embodiment can be implemented in combination with the aforementioned embodiment mode and embodiment as appropriate. That is, according to the invention, a position information detection system using an RF chip can be provided, of which position detection precision can be improved even in an environment in which an obstruction or a reflective object exists and a position and/or a shape of the obstruction or the reflective object is/are changed over time.

Embodiment 3

In this embodiment, a manufacturing method of the RF chip, which is different from that of the aforementioned embodiment, is described. A transistor in the invention can include a MOS transistor on a single crystalline substrate in addition to the thin film transistor formed over the insulating substrate shown in the aforementioned embodiment.

In this embodiment, as a circuit included in the RF chip, a p-channel transistor (also referred to as a pch-TFT) and an n-channel transistor (also referred to as an nch-TFT) included in an inverter or the like are typically shown. Hereinafter, a manufacturing method of the RF chip is described with reference to cross-sectional views shown in FIGS. 14A to 14C, 15A to 15C, and 16.

Figure 14A:
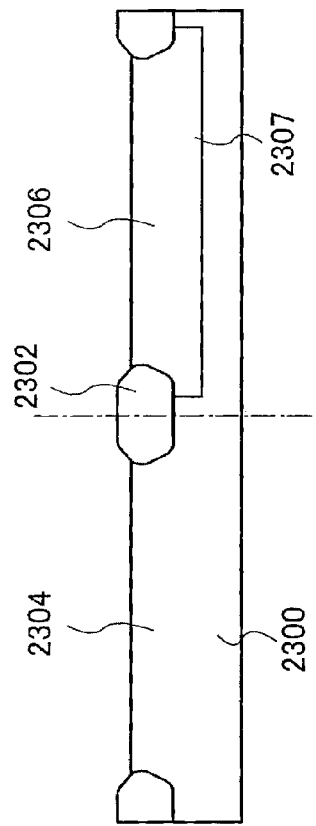
FIGS. 14A to 14C are diagrams showing a structure of Embodiment 3 using the invention.

First, element isolation regions 2304 and 2306 (hereinafter also referred to as regions 2304 and 2306) are formed in a semiconductor substrate 2300 (see FIG. 14A). Each of the regions 2304 and 2306 provided in the semiconductor substrate 2300 is isolated by an insulating film 2302 (also referred to as a field oxide film). Here, an example is shown in which a single crystalline Si substrate having n-type conductivity is used as the semiconductor substrate 2300 and a p-well 2307 is provided in the region 2306 of the semiconductor substrate 2300.

Any semiconductor substrate can be used as the substrate 2300. For example, a single crystalline Si substrate having n-type conductivity or p-type conductivity, a compound semiconductor substrate (e.g., a GaAs substrate, an InP substrate, a GaN substrate, a SiC substrate, a sapphire substrate, a ZnSe substrate, or the like), an SOI (Silicon On Insulator) substrate formed using a bonding method or a SIMOX (Separation by IMplanted OXygen) method, or the like can be used.

The element isolation regions 2304 and 2306 can be formed using a LOCOS (LOCal Oxidation of Silicon) method, a trench isolation method, or the like, as appropriate.

The p-well in the region 2306 of the semiconductor substrate 2300 can be formed by selectively introducing a p-type impurity element into the semiconductor substrate 2300. As the p-type impurity element, boron (B), aluminum (Al), gallium (Ga), or the like can be used.

Note that in this embodiment, an impurity element is not introduced into the region 2304 since the semiconductor substrate having n-type conductivity is used as the semiconductor substrate 2300; however, an n-well may be formed in the region 2304 by introducing an n-type impurity element. As the n-type impurity element, phosphorus (P), arsenic (As), or the like can be used. On the other hand, when a semiconductor substrate having p-type conductivity is used, a structure may be employed where an n-well is formed by introducing the n-type impurity element into the region 2304 and an impurity element is not introduced into the region 2306.

Figure 14B:
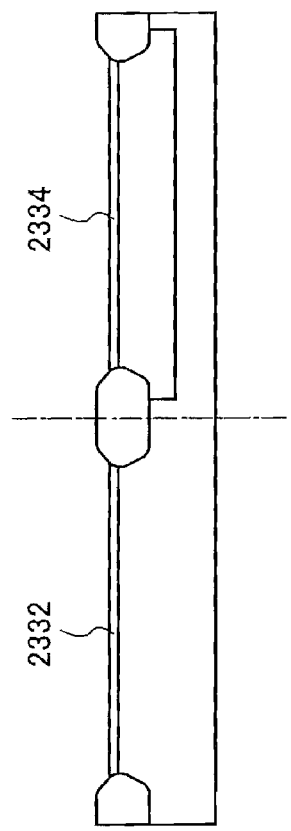

Next, insulating films 2332 and 2334 are formed to cover the regions 2304 and 2306 respectively (see FIG. 14B).

The insulating films 2332 and 2334 can be formed of, for example, silicon oxide films by oxidizing surfaces of the regions 2304 and 2306 provided in the semiconductor substrate 2300 by heat treatment. Alternatively, the insulating films 2332 and 2334 may have a stacked-layer structure of a silicon oxide film and a film containing oxygen and nitrogen (a silicon oxynitride film) by forming a silicon oxide film by a thermal oxidation method and then nitriding a surface of the silicon oxide film by nitridation treatment.

Alternatively, the insulating films 2332 and 2334 may by formed using plasma treatment as described above. For example, oxidation treatment or nitridation treatment is performed on the surfaces of the regions 2304 and 2306 provided in the semiconductor substrate 2300 by high-density plasma treatment, whereby silicon oxide (SiOx) films or silicon nitride (SiNx) films can be formed as the insulating films 2332 and 2334. Further, after oxidation treatment is performed on the surfaces of the regions 2304 and 2306 by high-density plasma treatment, nitride treatment may be performed by high-density plasma treatment again. In this case, silicon oxide films are formed in contact with the surfaces of the regions 2304 and 2306 and silicon oxynitride films are formed on the silicon oxide films, whereby each of the insulating films 2332 and 2334 has a stacked-layer structure of the silicon oxide film and the silicon oxynitride film. Further, after silicon oxide films are formed on the surfaces of the regions 2304 and 2306 by a thermal oxidation method, oxidation treatment or nitridation treatment may be performed by high-density plasma treatment.

The insulating films 2332 and 2334 formed in the regions 2304 and 2306 of the semiconductor substrate 2300 function as gate insulating films in transistors to be completed later.

Figure 14C:
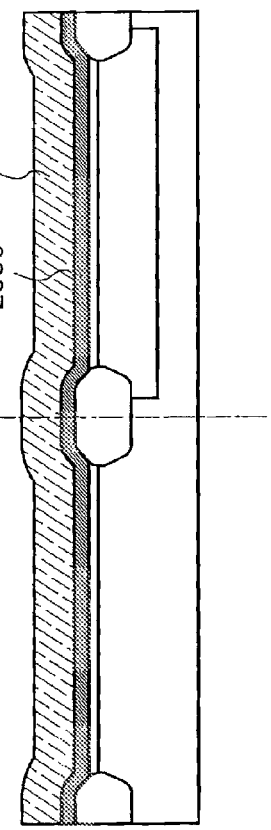

Next, a conductive film is formed to cover the insulating films 2332 and 2334 formed above the regions 2304 and 2306 (see FIG. 14C). Here, an example is shown in which a conductive film 2336 and a conductive film 2338 are sequentially stacked to form the conductive film. It is needless to say that the conductive film may be a single-layer structure or a stacked-layer structure of three or more layers.

The conductive films 2336 and 2338 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, the conductive films 2336 and 2338 can be formed of a metal nitride film obtained by nitriding the above-described element or formed of a semiconductor material typified by polycrystalline silicon doped with an impurity element such as phosphorus.

Here, the conductive film 2336 is formed by using tantalum nitride and the conductive film 2338 is formed thereover by using tungsten so that a stacked-layer structure is provided. Alternatively, as the conductive film 2336, a single layer or a stacked-layer film of tungsten nitride, molybdenum nitride, and/or titanium nitride can be used. As the conductive film 2338, a single layer or a stacked-layer film of tantalum, molybdenum, and/or titanium can be used.

Figure 15A:
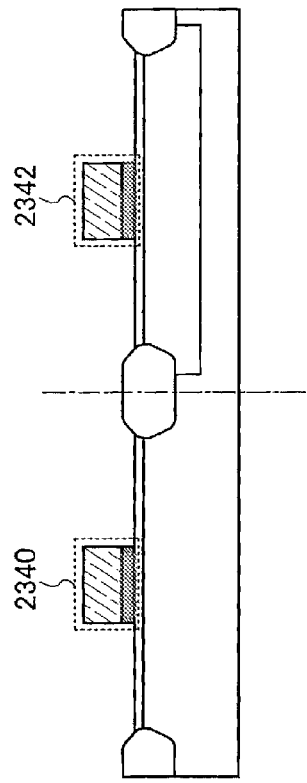
FIGS. 15A to 15C are diagrams showing a structure of Embodiment 3 using the invention.

Next, the stacked conductive films 2336 and 2338 are selectively removed by etching, whereby the conductive films 2336 and 2338 partially remain above the regions 2304 and 2306 to form gate electrodes 2340 and 2342 respectively (see FIG. 15A).

Figure 15B:
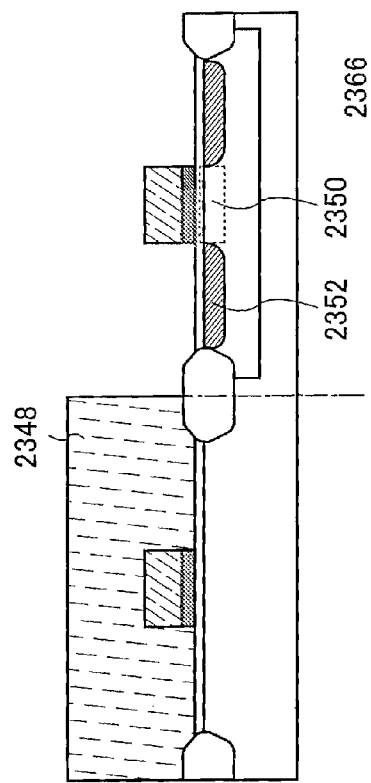

Next, a resist mask 2348 is selectively formed to cover the region 2304, and an impurity element is introduced into the region 2306 by using the resist mask 2348 and the gate electrode 2342 as masks, so that an impurity region is formed (see FIG. 15B). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, phosphorus (P) is used as the impurity element.

In FIG. 15B, by introducing the impurity element, an impurity region 2352 forming a source region or a drain region and a channel formation region 2350 are formed in the region 2306.

Figure 15C:
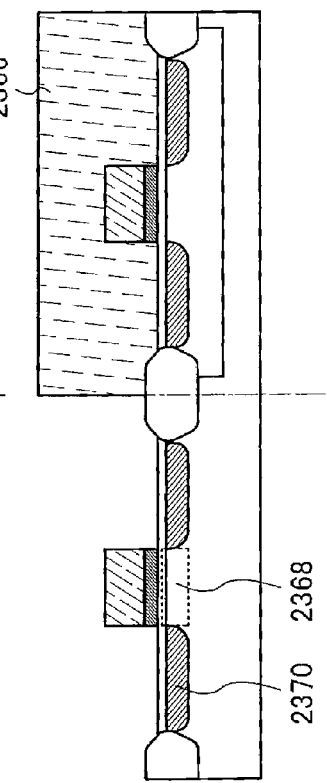

Next, a resist mask 2366 is selectively formed to cover the region 2306, and an impurity element is introduced into the region 2304 by using the resist mask 2366 and the gate electrode 2340 as masks, so that an impurity region is formed (see FIG. 15C). As the impurity element, an impurity element imparting n-type conductivity or an impurity element imparting p-type conductivity is used. As the n-type impurity element, phosphorus (P), arsenic (As), or the like can be used. As the p-type impurity element, boron (B), aluminum (Al), gallium (Ga), or the like can be used. Here, an impurity element (e.g., boron (B)) which has different conductivity from the impurity element introduced into the region 2306 in FIG. 15B is introduced. As a result, an impurity region 2370 forming a source region or a drain region and a channel formation region 2368 are formed in the region 2304.

Figure 16:
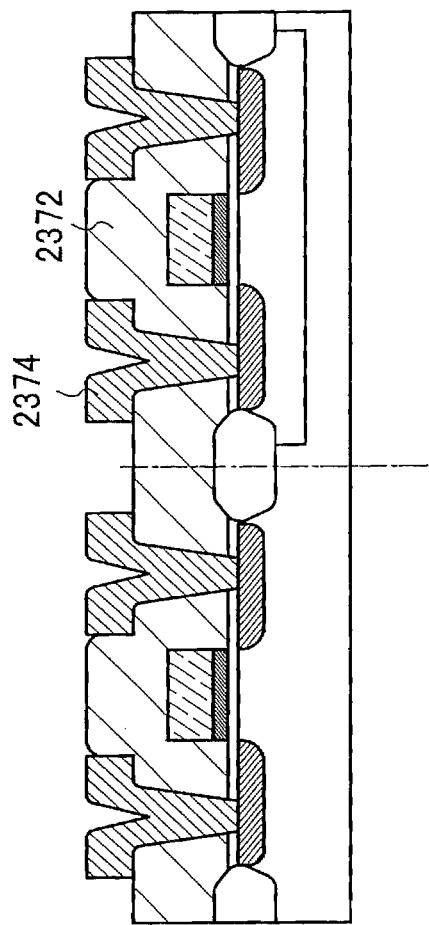
FIG. 16 is a diagram showing a structure of Embodiment 3 using the invention.

Next, second insulating films 2372 are formed to cover the insulating films 2332 and 2334 and the gate electrodes 2340 and 2342, and wirings 2374 which are electrically connected to the impurity regions 2352 and 2370 formed in the regions 2304 and 2306 respectively are formed over the second insulating films 2372 (see FIG. 16).

The second insulating film 2372 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (O). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

The wirings 2374 are formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to, for example, a material which contains aluminum as its main component and also contains nickel; or an alloy material which contains aluminum as its main component and also contains nickel and one or both of carbon and silicon. The wirings 2374 preferably employ, for example, a stacked-layer structure of a barrier film, an aluminum-silicon (Al—Si) film, and a barrier film; or a stacked-layer structure of a barrier film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the wirings 2374. In addition, when upper and lower barrier layers are provided, generation of hillocks of aluminum or aluminum silicon can be prevented. Further, when a barrier film is formed of titanium which is a highly-reducible element, even if a thin natural oxide film is formed on the crystalline semiconductor film, the natural oxide film is reduced so that preferable contact with the crystalline semiconductor film can be obtained.

Note that a structure of each transistor included in a semiconductor device of the invention is not limited to the structure shown in the drawing. For example, a transistor can have an inversely staggered structure, a FinFET structure, or the like. It is preferable to have a FinFET structure since a short channel effect due to miniaturization of transistor size can be suppressed.

Note that this embodiment can be implemented in combination with the aforementioned embodiment mode and embodiments as appropriate. That is, according to the invention, a position information detection system using an RF chip can be provided, of which position detection precision can be improved even in an environment in which an obstruction or a reflective object exists and a position and/or a shape of the obstruction or the reflective object is/are changed over time.

Embodiment 4

In this embodiment, a manufacturing method of the RF chip, which is different from that of the aforementioned embodiments, is described. A transistor in the invention can include a MOS transistor formed by a different manufacturing method from that of the MOS transistor on the single crystalline substrate shown in the aforementioned embodiment.

In this embodiment, as a circuit included in the RF chip, a p-channel transistor (also referred to as a pch-TFT) and an n-channel transistor (also referred to as an nch-TFT) included in an inverter or the like are typically shown. Hereinafter, a manufacturing method of the RF chip is described with reference to cross-sectional views shown in FIGS. 17A to 17C, 18A to 18C, 19A to 19C, and 20.

First, an insulating film is formed on a substrate 2600. Here, a single crystalline Si having n-type conductivity is used as the substrate 2600, and an insulating film 2602 and an insulating film 2604 are formed on the substrate 2600 (see FIG. 17A). For example, silicon oxide (SiOx) is formed as the insulating film 2602 by performing heat treatment on the substrate 2600, and silicon nitride (SiNx) is formed on the insulating film 2602 by a CVD method.

Any semiconductor substrate can be used as the substrate 2600. For example, a single crystalline Si substrate having n-type conductivity or p-type conductivity, a compound semiconductor substrate (e.g., a GaAs substrate, an InP substrate, a GaN substrate, a SiC substrate, a sapphire substrate, a ZnSe substrate, or the like), an SOI (Silicon On Insulator) substrate formed using a bonding method or a SIMOX (Separation by IMplanted OXygen) method, or the like can be used.

Alternatively, after the insulating film 2602 is formed, the insulating film 2602 may be nitrided by high-density plasma treatment so that the insulating film 2604 is formed. Note that the insulating film provided on the substrate 2600 may have a single-layer structure or a stacked-layer structure of three or more layers.

Figure 17A:
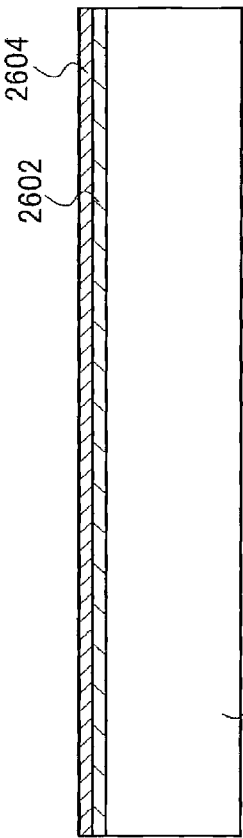
FIGS. 17A to 17C are diagrams showing a structure of Embodiment 4 using the invention.
Figure 17B:
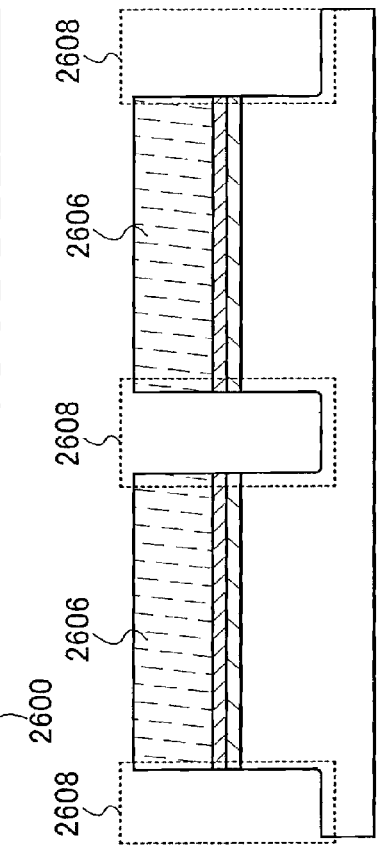

Next, a pattern of a resist mask 2606 is selectively formed over the insulating film 2604, and etching is selectively performed using the resist mask 2606 as a mask, whereby depressions 2608 are selectively formed in the substrate 2600 (see FIG. 17B). Dry etching utilizing plasma can be performed as etching of the substrate 2600 and the insulating films 2602 and 2604.

Figure 17C:
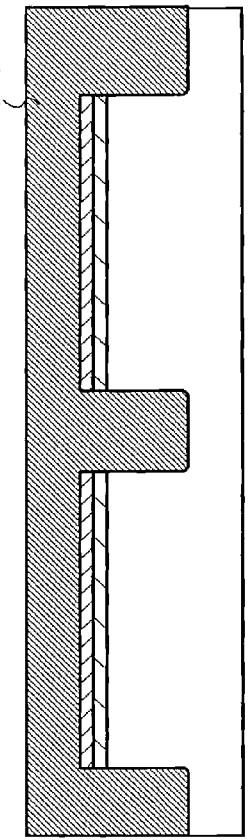

Next, after the pattern of the resist mask 2606 is removed, an insulating film 2610 is formed to fill the depressions 2608 formed in the substrate 2600 (see FIG. 17C).

The insulating film 2610 is formed using an insulating material such as silicon oxide, silicon nitride, silicon oxynitride (SiOxNy) (x>y>0), or silicon nitride oxide (SiNxOy) (x>y>0), by a CVD method, a sputtering method, or the like. Here, as the insulating film 2610, a silicon oxide film is formed using a TEOS (tetraethyl orthosilicate) gas by an atmospheric pressure CVD method or a low pressure CVD method.

Next, a surface of the substrate 2600 is exposed by grinding treatment, polishing treatment, or CMP (Chemical Mechanical Polishing) treatment. Here, by exposure of the surface of the substrate 2600, regions 2612 and 2613 are each provided between insulating films 2611 formed in the depressions 2608 of the substrate 2600. Note that the insulating films 2611 are obtained by removing the insulating film 2610 formed on the surface of the substrate 2600 by grinding treatment, polishing treatment, or CMP treatment. Then, a p-type impurity element is selectively introduced, whereby a p-well 2615 is formed in the region 2613 of the substrate 2600 (see FIG. 18A).

As the p-type impurity element, boron (B), aluminum (Al), gallium (Ga), or the like can be used. Here, as the impurity element, boron (B) is introduced into the region 2613.

Note that in this embodiment, an impurity element is not introduced into the region 2612 since the semiconductor substrate having n-type conductivity is used as the substrate 2600; however, an n-well may be formed in the region 2612 by introducing an n-type impurity element. As the n-type impurity element, phosphorus (P), arsenic (As), or the like can be used.

On the other hand, when the semiconductor substrate having p-type conductivity is used, a structure may be employed where an n-well is formed by introducing the n-type impurity element into the region 2612 and an impurity element is not introduced into the region 2613.

Figure 18A:
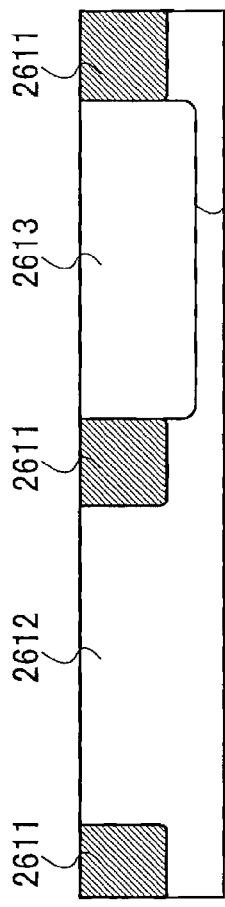
FIGS. 18A to 18C are diagrams showing a structure of Embodiment 4 using the invention.
Figure 18B:
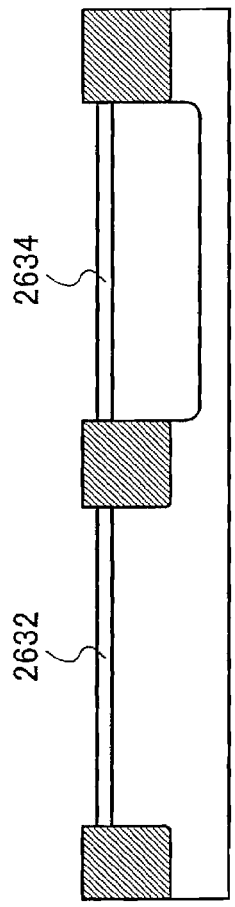

Next, insulating films 2632 and 2634 are formed on surfaces of the regions 2612 and 2613 of the substrate 2600 respectively (see FIG. 18B).

The insulating films 2632 and 2634 can be formed of, for example, silicon oxide films by oxidizing the surfaces of the regions 2612 and 2613 provided in the substrate 2600 by heat treatment. Alternatively, the insulating films 2632 and 2634 may have a stacked-layer structure of a silicon oxide film and a film containing oxygen and nitrogen (a silicon oxynitride film) by forming a silicon oxide film by a thermal oxidation method and then nitriding a surface of the silicon oxide film by nitridation treatment.

Alternatively, the insulating films 2632 and 2634 may by formed using plasma treatment as described above. For example, oxidation treatment or nitridation treatment is performed on the surfaces of the regions 2612 and 2613 provided in the substrate 2600 by high-density plasma treatment, whereby silicon oxide (SiOx) films or silicon nitride (SiNx) films can be formed as the insulating films 2632 and 2634. Further, after oxidation treatment is performed on the surfaces of the regions 2612 and 2613 by high-density plasma treatment, nitride treatment may be performed by high-density plasma treatment again. In this case, silicon oxide films are formed in contact with the surfaces of the regions 2612 and 2613 and silicon oxynitride films are formed on the silicon oxide films, whereby each of the insulating films 2632 and 2634 has a stacked-layer structure of the silicon oxide film and the silicon oxynitride film. Further, after silicon oxide films are formed on the surfaces of the regions 2612 and 2613 by a thermal oxidation method, oxidation treatment or nitridation treatment may be performed by high-density plasma treatment.

The insulating films 2632 and 2634 formed in the regions 2612 and 2613 of the substrate 2600 function as gate insulating films in transistors to be completed later.

Figure 18C:
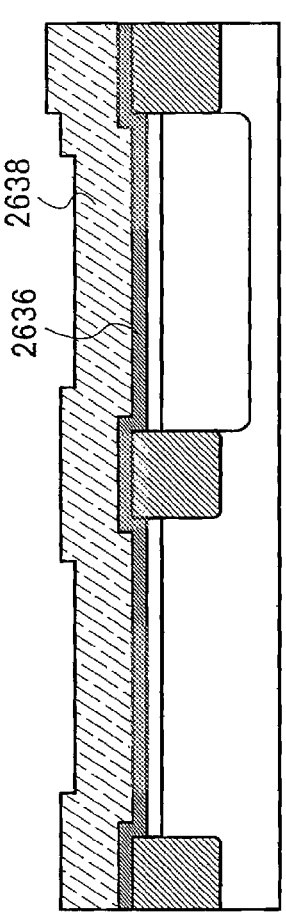

Next, a conductive film is formed to cover the insulating films 2632 and 2634 formed above the regions 2612 and 2613 provided in the substrate 2600 (see FIG. 18C). Here, an example is shown in which a conductive film 2636 and a conductive film 2638 are sequentially stacked to form the conductive film. It is needless to say that the conductive film may be a single-layer structure or a stacked-layer structure of three or more layers.

The conductive films 2636 and 2638 can be formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing the above-described element as its main component. Alternatively, the conductive films 2636 and 2638 can be formed of a metal nitride film obtained by nitriding the above-described element or formed of a semiconductor material typified by polycrystalline silicon doped with an impurity element such as phosphorus.

Here, the conductive film 2636 is formed by using tantalum nitride and the conductive film 2638 is formed thereover by using tungsten so that a stacked-layer structure is provided. Alternatively, as the conductive film 2636, a single layer or a stacked-layer film of tantalum nitride, tungsten nitride, molybdenum nitride, and/or titanium nitride can be used. As the conductive film 2638, a single layer or a stacked-layer film of tungsten, tantalum, molybdenum, and/or titanium can be used.

Figure 19A:
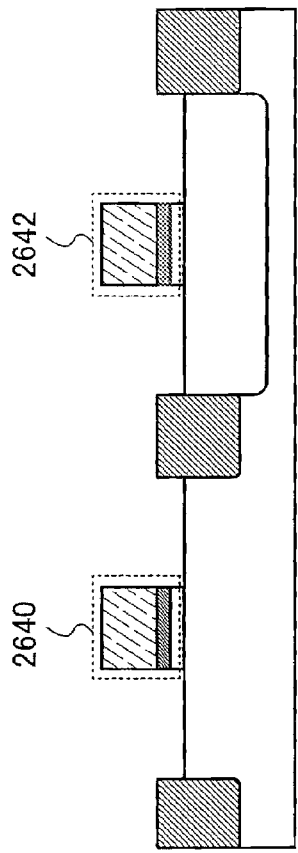
FIGS. 19A to 19C are diagrams showing a structure of Embodiment 4 using the invention.

Next, the stacked conductive films 2636 and 2638 are selectively removed by etching, whereby the conductive films 2636 and 2638 partially remain above the regions 2612 and 2613 of the substrate 2600 to form conductive films 2640 and 2642 functioning as gate electrodes (see FIG. 19A). Here, in the substrate 2600, surfaces of the regions 2612 and 2613, which do not overlap with the conductive films 2640 and 2642, are made exposed.

Specifically, in the region 2612 of the substrate 2600, a part of the insulating film 2632 formed below the conductive film 2640, which does not overlap with the conductive film 2640, is selectively removed so that ends of the conductive film 2640 and the insulating film 2632 are roughly aligned with each other. Further, in the region 2613 of the substrate 2600, a part of the insulating film 2634 formed below the conductive film 2642, which does not overlap with the conductive film 2642, is selectively removed so that ends of the conductive film 2642 and the insulating film 2634 are roughly aligned with each other.

In this case, parts of the insulating films and the like which do not overlap with the conductive films 2640 and 2642 may be removed at the same time as the formation of the conductive films 2640 and 2642, or they may be removed using the remaining resist mask or the conductive films 2640 and 2642 as masks after the conductive films 2640 and 2642 are formed.

Figure 19B:
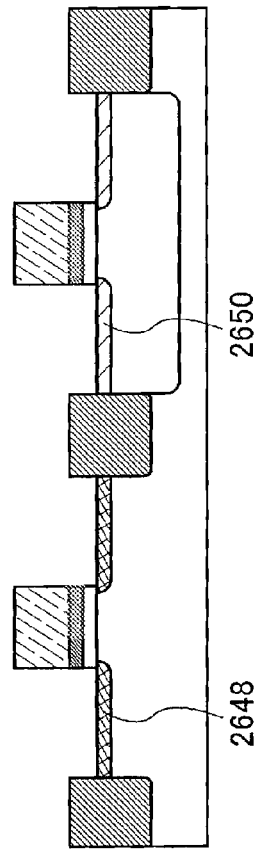

Next, an impurity element is selectively introduced into the regions 2612 and 2613 of the substrate 2600 (see FIG. 19B). Here, an impurity element imparting n-type conductivity is selectively introduced into the region 2613 at a low concentration, using the conductive film 2642 as a mask. An impurity element imparting p-type conductivity is selectively introduced into the region 2612 at a low concentration, using the conductive film 2640 as a mask. As the impurity element imparting n-type conductivity, phosphorus (P), arsenic (As), or the like can be used. As the impurity element imparting p-type conductivity, boron (B), aluminum (Al), gallium (Ga), or the like can be used.

Next, sidewalls 2654 in contact with side surfaces of the conductive films 2640 and 2642 are formed. Specifically, the sidewall is formed to have a single-layer structure or a stacked-layer structure using a film including an inorganic material such as silicon, oxide of silicon, or nitride of silicon; or a film including an organic material such as an organic resin, by a plasma CVD method, a sputtering method, or the like, and then, is selectively etched by anisotropic etching mainly in a perpendicular direction so as to be formed in contact with each side surface of the conductive films 2640 and 2642. Note that the sidewalls 2654 are used as masks for doping to form an LDD (Lightly Doped Drain) region. Here, the sidewalls 2654 are formed also to be in contact with side surfaces of the insulating films and the gate electrodes formed below the conductive films 2640 and 2642.

Figure 19C:
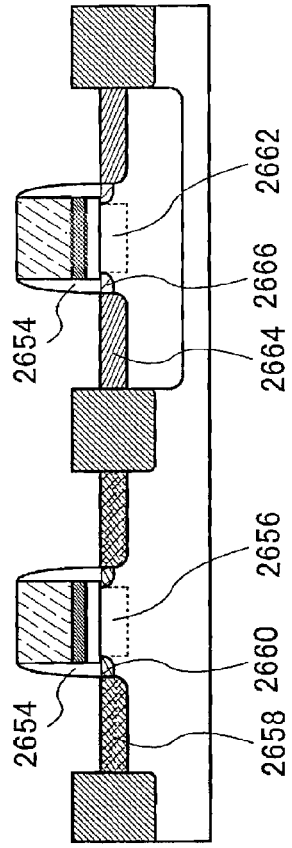

Then, an impurity element is introduced into the regions 2612 and 2613 of the substrate 2600, using the sidewalls 2654 and the conductive films 2640 and 2642 as masks, so that an impurity region functioning as a source region or a drain region is formed (see FIG. 19C). Here, an impurity element imparting n-type conductivity is introduced into the region 2613 of the substrate 2600 at a high concentration, using the sidewalls 2654 and the conductive film 2642 as masks. An impurity element imparting p-type conductivity is introduced into the region 2612 at a high concentration, using the sidewalls 2654 and the conductive film 2640 as masks.

As a result, in the region 2612 of the substrate 2600, an impurity region 2658 forming a source region or a drain region, a low concentration impurity region 2660 forming an LDD region, and a channel formation region 2656 are formed. In the region 2613 of the substrate 2600, an impurity region 2664 forming a source region or a drain region, a low concentration impurity region 2666 forming an LDD region, and a channel formation region 2662 are formed.

Note that in this embodiment, the impurity elements are introduced in a state where parts of the regions 2612 and 2613 of the substrate 2600, which do not overlap with the conductive films 2640 and 2642, are exposed. Accordingly, the channel formation regions 2656 and 2662 formed in the regions 2612 and 2613 of the substrate 2600 respectively can be formed in a self-aligned manner with the conductive films 2640 and 2642.

Next, a second insulating film 2677 is formed to cover the insulating films, the conductive films, and the like provided over the regions 2612 and 2613 of the substrate 2600, and openings 2678 are formed in the insulating film 2677 (see FIG. 20A).

The second insulating film 2677 can have a single-layer structure or a stacked-layer structure using an insulating film containing oxygen or nitrogen, such as silicon oxide (SiOx), silicon nitride (SiNx), silicon oxynitride (SiOxNy) (x>y), or silicon nitride oxide (SiNxOy) (x>y); a film containing carbon such as DLC (Diamond Like Carbon); an organic material such as epoxy, polyimide, polyamide, polyvinyl phenol, benzocyclobutene, or acrylic; or a siloxane material such as a siloxane resin, by a CVD method, a sputtering method, or the like. Note that a siloxane material corresponds to a material having Si—O—Si bonds. Siloxane has a skeleton structure formed of a bond of silicon (Si) and oxygen (O). As a substituent, an organic group (e.g., an alkyl group or aromatic hydrocarbon) containing at least hydrogen is used. Alternatively, a fluoro group, or an organic group containing at least hydrogen and a fluoro group may be used as a substituent.

Next, conductive films 2680 are formed in the openings 2678 by a CVD method. Then, conductive films 2682a to 2682d are selectively formed over the insulating film 2677 to be electrically connected to the conductive films 2680 (see FIG. 20B).

The conductive films 2680 and 2682a to 2682d are formed to have a single-layer structure or a stacked-layer structure using an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing the above-described element as its main component, by a CVD method, a sputtering method, or the like. An alloy material containing aluminum as its main component corresponds to, for example, a material which contains aluminum as its main component and also contains nickel; or an alloy material which contains aluminum as its main component and also contains nickel and one or both of carbon and silicon. The conductive films 2680 and 2682a to 2682d preferably employ, for example, a stacked-layer structure of a barrier film, an aluminum-silicon (Al—Si) film, and a barrier film; or a stacked-layer structure of a barrier film, an aluminum-silicon (Al—Si) film, a titanium nitride film, and a barrier film. Note that a barrier film corresponds to a thin film formed of titanium, nitride of titanium, molybdenum, or nitride of molybdenum. Since aluminum and aluminum silicon have low resistance and are inexpensive, they are optimum materials for forming the conductive films 2680. In addition, provision of upper and lower barrier layers can prevent generation of hillocks of aluminum or aluminum silicon. Further, when a barrier film is formed of titanium which is a highly-reducible element, even if a thin natural oxide film is formed on the crystalline semiconductor film, the natural oxide film is reduced so that preferable contact with the crystalline semiconductor film can be obtained. Here, the conductive films 2680 can be formed by selective growth of tungsten (W) using a CVD method.

Through the above-described steps, a semiconductor device which includes a p-channel transistor formed in the region 2612 of the substrate 2600 and an n-channel transistor formed in the region 2613 can be obtained.

Note that a structure of each transistor included in a semiconductor device of the invention is not limited to the structure shown in the drawing. For example, a transistor can have an inversely staggered structure, a FinFET structure, or the like. It is preferable to have a FinFET structure since a short channel effect due to miniaturization of transistor size can be suppressed.

Note that this embodiment can be implemented in combination with the aforementioned embodiment mode and embodiments as appropriate. That is, according to the invention, a position information detection system using an RF chip can be provided, of which position detection precision can be improved even in an environment in which an obstruction or a reflective object exists and a position and/or a shape of the obstruction or the reflective object is/are changed over time.

Embodiment 5

Figure 21:
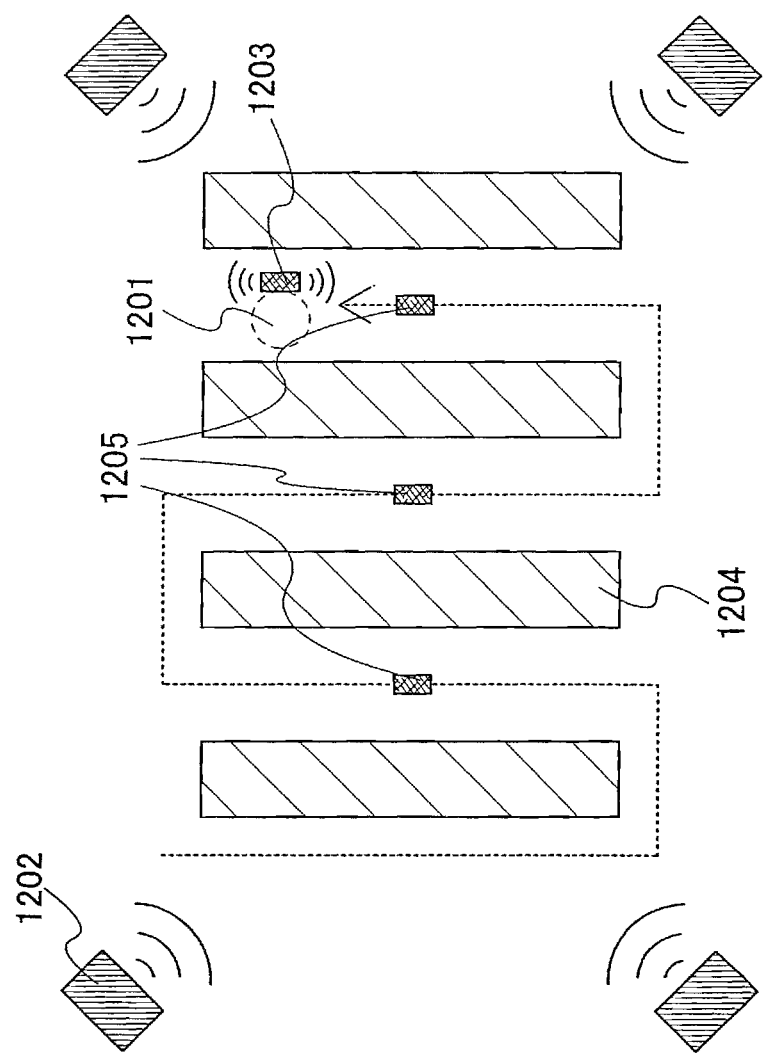
FIG. 21 is a diagram showing a structure of Embodiment 5 using the invention.

In this embodiment, a product management system and a management system of a moving object in a room or the like are described as an example of utilizing a position detection system according to the invention, with reference to FIG. 21.

First, the case where a customer purchases a product in a store is described with reference to FIG. 21. A semiconductor device (hereinafter referred to as an RF chip) used for a position detection system of the invention is attached to a product displayed in the store.

A customer 1201 having a product 1203 provided with the RF chip used for the position detection system of the invention moves in the store surrounded by reader/writers 1202 for position detection. As shown in the embodiment mode, a manager can manage a flow line of the customer 1201 moving around display cabinets 1204 by detecting a position using the RF chip and the reader/writers 1202 provided in the store. In the invention, even when the display cabinet 1204 is moved or attenuation of a signal is changed in accordance with movement of another customer, movement of the customer can be managed. It is preferable to record and manage the flow line of the customer precisely since marketing such as a location for providing a product and product management can be performed efficiently.

As shown in this embodiment, a flow line of the product in the store is observed in real time by a plurality of reader/ writers provided in the store, so that theft can be prevented without the customer going through a gate of a reader/writer for preventing theft from the display cabinets. Further, since the flow line of the product can be observed in real time, the manager can predict information on movement of a thief in advance with use of a computer or the like, and take measures such as blocking the passage, and thus, theft of the product can also be prevented. Accordingly, the manager can capture the thief without directly catching the thief, whereby the thief can be easily caught.

In this embodiment, the manager can manage position information of the product in real time without the customer noticing the reader/writer and the RF chip, when the reader/writer is provided in a part of tiles of a floor, a part of pillars, a ceiling, or the like. By the position detection system of the invention using the RF chip, a flow line of the product in a small area, which is difficult for a GPS or the like to trace, can be easily traced. Further, the semiconductor device in the position detection system of the invention can cover a range of several meters when an antenna for the UHF band is used. Further, it is preferable that the semiconductor device in the position detection system of the invention have a collision avoidance function since a plurality of moving objects can also be managed.

A position detection system of the invention is effective in preventing theft when a surveillance camera or the like is used together. The manager can perform management from a remote place more certainly and easily.

In addition, it is preferable that a position of an obstruction such as the display cabinet 1204 can be observed more precisely by increase in the number of reader/writers in the invention.

Note that this embodiment can be implemented in combination with the aforementioned embodiment mode and embodiments as appropriate. That is, according to the invention, a position information detection system using an RF chip can be provided, of which position detection precision can be improved even in an environment in which an obstruction or a reflective object exists and a position and/or a shape of the obstruction or the reflective object is/are changed over time.

This application is based on Japanese Patent Application serial No. 2006-198261 filed in Japan Patent Office on Jul. 20, 2006, the entire contents of which are hereby incorporated by reference.

What is claimed is:

1. A position information detection system comprising:
a first semiconductor device;
a second semiconductor device; and
a reader/writer which transmits and receives data by transmission and reception of a radio signal to/from the first semiconductor device and the second semiconductor device,
wherein the first semiconductor device has a function to detect a first signal intensity of a radio signal transmitted from the reader/writer, a function to calculate a first calculated distance from the first signal intensity, and a function to transmit data on the first calculated distance to the reader/writer;
wherein the second semiconductor device has a function to detect a second signal intensity of a radio signal transmitted from the reader/writer, a function to calculate a second calculated distance from the second signal intensity, and a function to transmit data on the second calculated distance to the reader/writer;
wherein each of the first semiconductor device and the second semiconductor device has a secondary battery, the secondary battery being charged by the radio signal; and
wherein the reader/writer has a function to calculate a position of the second semiconductor device from the first calculated distance, the second calculated distance, a position of the first semiconductor device, and a position of the reader/writer.

2. A position information detection system comprising:
a first semiconductor device;
a second semiconductor device; and
a reader/writer which transmits and receives data by transmission and reception of a radio signal to/from the first semiconductor device and the second semiconductor device,
wherein the first semiconductor device has a function to detect a first signal intensity of a radio signal transmitted from the reader/writer and a function to transmit data on the first signal intensity to the reader/writer;
wherein the second semiconductor device has a function to detect a second signal intensity of a radio signal transmitted from the reader/writer and a function to transmit data on the second signal intensity to the reader/writer;
wherein each of the first semiconductor device and the second semiconductor device has a secondary battery, the secondary battery being charged by the radio signal; and
wherein the reader/writer has a function to calculate a first calculated distance from the first signal intensity, a function to calculate a second calculated distance from the second signal intensity, and a function to calculate a position of the second semiconductor device from the first calculated distance, the second calculated distance, a position of the first semiconductor device, and a position of the reader/writer.

3. A position information detection system comprising:
a first semiconductor device;
a second semiconductor device; and
a reader/writer which transmits and receives data by transmission and reception of a radio signal to/from the first semiconductor device and the second semiconductor device,
wherein each of the first semiconductor device and the second semiconductor device has a secondary battery, the secondary battery being charged by the radio signal; and
wherein the reader/writer has a function to detect a first signal intensity of a radio signal transmitted from the first semiconductor device, a function to calculate a first calculated distance from the first signal intensity, a function to detect a second signal intensity of a radio signal transmitted from the second semiconductor device, a function to calculate a second calculated distance from the second signal intensity, and a function to calculate a position of the second semiconductor device from the first calculated distance, the second calculated distance, a position of the first semiconductor device, and a position of the reader/writer.

4. The position information detection system according to claim 1, wherein the reader/writer has a function to compare the first calculated distance with the position of the first semiconductor device, and a function to calculate the position of the second semiconductor device from the second calculated distance and the position of the reader/writer, based on a comparison of the first calculated distance with the position of the first semiconductor device.

5. The position information detection system according to claim 2, wherein the reader/writer has a function to compare the first calculated distance with the position of the first semiconductor device, and a function to calculate the position of the second semiconductor device from the second calculated distance and the position of the reader/writer, based on a comparison of the first calculated distance with the position of the first semiconductor device.

6. The position information detection system according to claim 3, wherein the reader/writer has a function to compare the first calculated distance with the position of the first semiconductor device, and a function to calculate the position of the second semiconductor device from the second calculated distance and the position of the reader/writer, based on a comparison of the first calculated distance with the position of the first semiconductor device.

7. The position information detection system according to claim 1, wherein the first semiconductor device, the second semiconductor device, or the reader/writer is comprised of a transistor including a semiconductor film provided over a substrate.

8. The position information detection system according to claim 2, wherein the first semiconductor device, the second semiconductor device, or the reader/writer is comprised of a transistor including a semiconductor film provided over a substrate.

9. The position information detection system according to claim 3, wherein the first semiconductor device, the second semiconductor device, or the reader/writer is comprised of a transistor including a semiconductor film provided over a substrate.

10. The position information detection system according to claim 1, wherein the first semiconductor device or the second semiconductor device is comprised of a MOS transistor on a single crystalline substrate.

11. The position information detection system according to claim 2, wherein the first semiconductor device or the second semiconductor device is comprised of a MOS transistor on a single crystalline substrate.

12. The position information detection system according to claim 3, wherein the first semiconductor device or the second semiconductor device is comprised of a MOS transistor on a single crystalline substrate.

13. A position information detection method comprising:
transmitting a first radio signal from a reader/writer to a first semiconductor device, and transmitting a second radio signal from the reader/writer to a second semiconductor device;
receiving the first radio signal and detecting a first signal intensity of the first radio signal in the first semiconductor device, and receiving the second radio signal and detecting a second signal intensity of the second radio signal in the second semiconductor device;
calculating a first calculated distance from the first signal intensity in the first semiconductor device, and calculating a second calculated distance from the second signal intensity in the second semiconductor device;
transmitting data on the first calculated distance from the first semiconductor device to the reader/writer, and transmitting data on the second calculated distance from the second semiconductor device to the reader/writer;
receiving data on the first calculated distance, comparing the first calculated distance with a position of the first semiconductor device, and determining a correction method of a calculated distance based on a comparison of the first calculated distance with the position of the first semiconductor device, in the reader/writer; and receiving data on the second calculated distance and calculating a position of the second semiconductor device from the second calculated distance and a position of the reader/writer, based on the correction method, in the reader/writer,
wherein the first semiconductor device has a first secondary battery, the first secondary battery being charged by the first radio signal; and
wherein the second semiconductor device has a second secondary battery, the second secondary battery being charged by the second radio signal.

14. A position information detection method comprising:
transmitting a first radio signal from a reader/writer to a first semiconductor device, and transmitting a second radio signal from the reader/writer to a second semiconductor device;
receiving the first radio signal and detecting a first signal intensity of the first radio signal in the first semiconductor device, and receiving the second radio signal and detecting a second signal intensity of the second radio signal in the second semiconductor device;
transmitting data on the first signal intensity from the first semiconductor device to the reader/writer, and transmitting data on the second signal intensity from the second semiconductor device to the reader/writer;
receiving data on the first signal intensity, calculating a first calculated distance from the first signal intensity, comparing the first calculated distance with a position of the first semiconductor device, and determining a correction method of a calculated distance based on a comparison of the first calculated distance with the position of the first semiconductor device, in the reader/writer; and
receiving data on the second signal intensity, calculating a second calculated distance from the second signal intensity and calculating a position of the second semiconductor device from the second calculated distance and a position of the reader/writer, based on the correction method, in the reader/writer,
wherein the first semiconductor device has a first secondary battery, the first secondary battery being charged by the first radio signal; and
wherein the second semiconductor device has a second secondary battery, the second secondary battery being charged by the second radio signal.

15. A position information detection method comprising:
transmitting a first radio signal from a first semiconductor device to a reader/writer, and transmitting a second radio signal from a second semiconductor device to the reader/writer;
receiving the first radio signal and detecting a first signal intensity of the first radio signal, and receiving the second radio signal and detecting a second signal intensity of the second radio signal, in the reader/writer;
calculating a first calculated distance from the first signal intensity, comparing the first calculated distance with a position of the first semiconductor device, and determining a correction method of a calculated distance based on a comparison of the first calculated distance with the position of the first semiconductor device in the reader/writer; and
calculating a second calculated distance from the second signal intensity, and calculating a position of the second semiconductor device from the second calculated distance and a position of the reader/writer, based on the correction method, in the reader/writer, wherein each of the first semiconductor device and the second semiconductor device has a secondary battery, the secondary battery being charged by a radio signal from the reader/writer.

* * * * *